(12) United States Patent
Dollin et al.

(10) Patent No.: US 7,287,243 B2
(45) Date of Patent: Oct. 23, 2007

(54) CODE VERIFICATION SYSTEM AND METHOD

(75) Inventors: Christopher Dollin, Yate (GB); Vaideswar Gopalakrishnan, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 774 days.

(21) Appl. No.: 10/752,989

(22) Filed: Jan. 6, 2004

(65) Prior Publication Data

US 2005/0188270 A1    Aug. 25, 2005

(51) Int. Cl.
*G06F 9/44* (2006.01)
*G06F 9/45* (2006.01)
*G06F 11/00* (2006.01)

(52) U.S. Cl. ............ 717/126; 717/124; 717/129; 717/143; 714/15

(58) Field of Classification Search ........ 717/126, 717/124, 129, 143; 714/15
See application file for complete search history.

(56) References Cited

U.S. PATENT DOCUMENTS

| | | | |
|---|---|---|---|
| 4,819,233 A | | 4/1989 | Delucia et al. |
| 5,740,441 A | * | 4/1998 | Yellin et al. ............ 717/134 |
| 5,748,964 A | * | 5/1998 | Gosling ............ 717/126 |
| 5,892,947 A | | 4/1999 | DeLong et al. |
| 6,026,237 A | * | 2/2000 | Berry et al. ............ 717/130 |
| 6,070,239 A | * | 5/2000 | McManis ............ 719/315 |
| 6,092,147 A | * | 7/2000 | Levy et al. ............ 717/148 |
| 6,219,829 B1 | | 4/2001 | Sivakumar et al. |
| 6,249,882 B1 | | 6/2001 | Testardi |
| 6,314,558 B1 | * | 11/2001 | Angel et al. ............ 717/118 |
| 6,353,897 B1 | | 3/2002 | Nock et al. |
| 6,594,783 B1 | | 7/2003 | Dollin et al. |
| 6,601,114 B1 | * | 7/2003 | Bracha et al. ............ 719/332 |
| 6,618,769 B1 | * | 9/2003 | Bracha et al. ............ 717/165 |
| 6,618,855 B1 | * | 9/2003 | Lindholm et al. ............ 717/126 |
| 6,671,874 B1 | | 12/2003 | Passova |
| 2002/0194579 A1 | | 12/2002 | Dollin et al. |

OTHER PUBLICATIONS

Freund, et al. "A Type System for Object Initialization in the Java Bytecode Language", 2000, ACM, pp. 1196-1250.*
Knoblock, et al. "Type Elaboration and Subtype Completion for Java Bytecode", 2000, ACM, p. 228-242.*
Goldberg, Allen "A Specification of Java Loading and Bytecode Verification", 1998, ACM, p. 49-58.*

* cited by examiner

*Primary Examiner*—Wei Zhen
*Assistant Examiner*—Qamrun Nahar

(57) ABSTRACT

The system of the present disclosure comprises memory for storing a compiled program. The system further comprises logic configured to translate the compiled program into a set of human-readable instructions and construct a coarse tree representing the program flow of the set of human-readable instructions. The logic is further configured to compute a first type signature representative of a code construct comprising alternative code paths within the program flow and determine a second type signature representative of the coarse tree based upon the first type signature.

24 Claims, 28 Drawing Sheets

```
public class CustomTest
{
    public static void main (String[] args)
    {
outer: for(int i = 0; i < 10; i ++) {
        for(int j = 0; j < 10; j ++) {
            for(int j = 0; j < 10: j ++) {
                if(i < 5)
                    continue;
                if(i == 6)
                    continue outer;
                if(i == 8)
                    break outer;
                if(i == 7)
                    break;
            }
        }
    }
}
```

FIG. 11 A

```
main
0(0):    inconst_0
1(1):    istore_1
2(2):    Branch:goto              57
5(3):    inconst_0
6(4):    instore_2
7(5):    Branch:goto              48
10(6):   iload_1
11(7):   inconst_5
12(8):   Branch:if_icmpge18  15
15(9):   Branch:goto 45
18(10):  iload_1
19(11):  bipush
21(12):  Branch:if_icmpne27  24
24(13):  Branch:goto 45
27(14):  iload_1
28(15):  bipush
30(16):  Branch:if_icmpne36  33
33(17):  Branch:goto 63
36(18):  iload_1
37(19):  bipush
39(20):  Branch:if_icmpne45  42
42(21):  Branch:goto 54
45(22):  iine
48(23):  iload_2
49(24):  bipush
51(25):  Branch:if_icmplt         10 54
54(26):  iinc
57(27):  iload_1
58(28):  bipush
60(29):  Branch:if_icmpt          5 63
63(30):  Branch:return
```

FIG. 11 B

```
Block   0(3)->57G
Block   5(3)->48G L:57
Block   10(3)->18G, 15G l:57, 48
Block   15(1)->45G l:57, 48
Block   18(3)->27G, 24B L:57, 48
Block   24(1)->45G L:57
Block   27(3)->36G, 33B L:57, 48
Block   33(1)->63G
Block   36(3)->45G, 42B L:57, 48
Block   42(1)->54G L:57
Block   45(1)->48R L:57, 48
Block   48(3)->10G, 54B L:57, 48 Via:18, 10, 48, 15, 45, 36, 27
Block   54(1)->57R L:57
Block   57(3)->5G, 63B L:57 Via: 45, 36, 27, 54, 18, 10, 42, 5, 57, 24, 48, 15
Block   63(1)
```

FIG. 11 C

```
0.    -SeqNode
1.    | -RawBlockNode (0)
2.    | -LoopNode (57 brks = 63, 33)
3.    | % -IfNode
4.    | % | -RawBlockNode (57)
5.    | % | -SeqNode
6.    | % | % -RawBlockNode (5)
7.    | % | % -LoopNode (48 brks=54, 24, 42)
8.    | % | % | -IfNode
9.    | % | % | % -RawBlockNode (48)
10.   | % | % | %-IfNode
11.   | % | % | % | -RawBlockNode (10)
12.   | % | % | % | -IfNode
13.   | % | % | % | % -RawBlockNode (18)
14.   | % | % | % | % -IfNode
15.   | % | % | % | % | -RawBlockNode (27)
16.   | % | % | % | % | -IfNode
17.   | % | % | % | % | % -RawBlockNode (36)
18.   | % | % | % | % | % -SeqNode
19.   | % | % | % | % | % | -RawBlockNode (45)
20.   | % | % | % | % | % | -ContinueNode (Loop=48)
21.   | % | % | % | % | % -BreakNode (Loop=48 Target=42)
22.   | % | % | % | % | -BreakNode (Loop=57 Target=33)
23.   | % | % | % | % -BreakNode (Loop=48 Target=24)
24.   | % | % | % | -SeqNode
25.   | % | % | % | % -RawBlockNode (15)
26.   | % | % | % | % -RawBlockNode (45)
27.   | % | % | % | % -ContinueNode (Loop=48)
28.   | % | % | % -BreakNode (Loop=48 Target=54)
29.   | % | -BreakNode (Loop=57 Target=63)
```

FIG. 11E

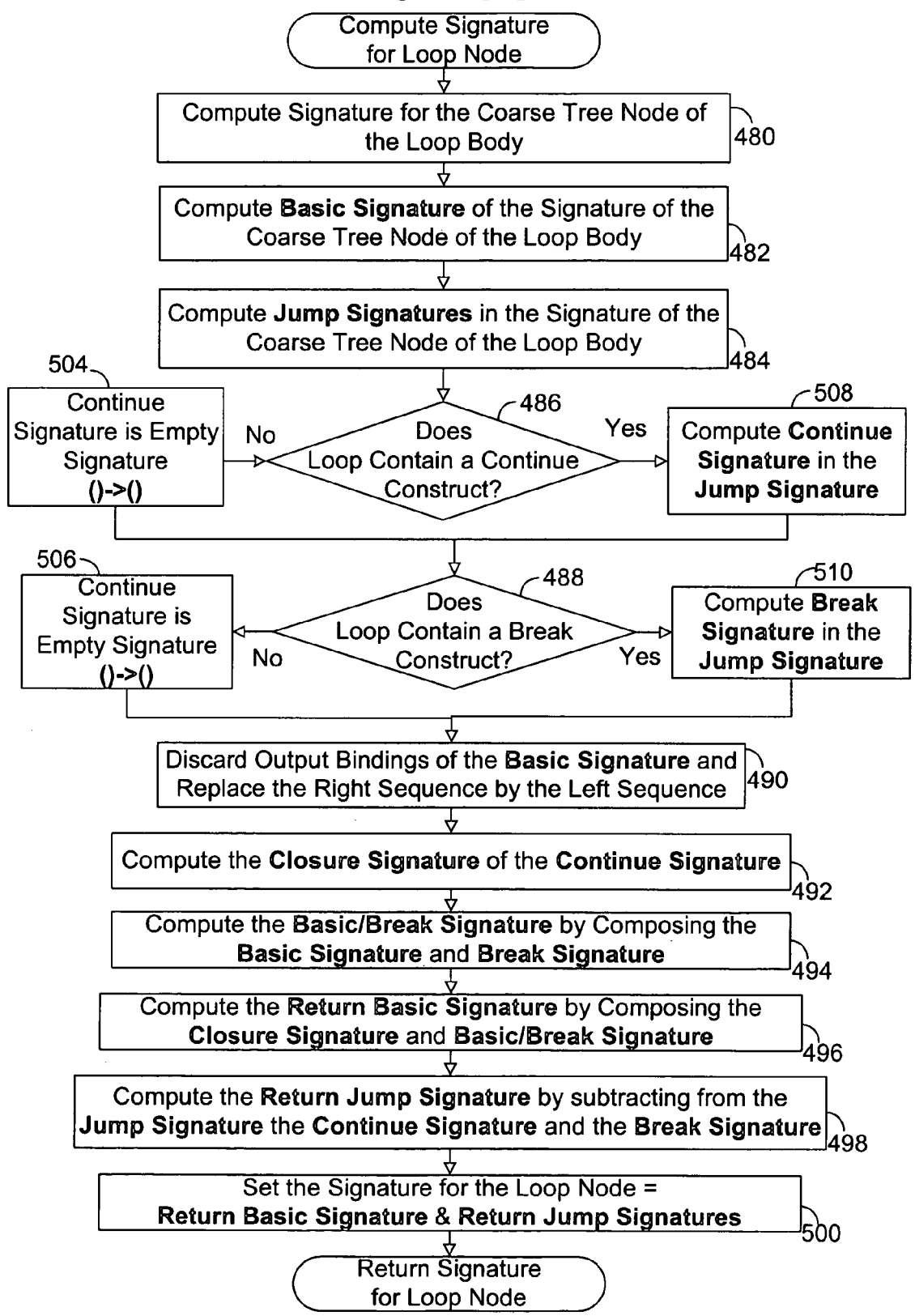

CODE VERIFICATION SYSTEM AND METHOD

FIELD OF THE INVENTION

The present disclosure generally pertains to code verification and, more specifically, to systems and methods for computing type signatures based on coarse trees representative of compiled programs and for performing type checking for the compiled programs based on the type signatures.

DESCRIPTION OF RELATED ART

During compilation, computer code is often checked for errors before the computer code is allowed to execute. Such testing helps to ensure that data errors do not occur during execution. However, a set of computer code is not always compiled by a trusted source. For example, compiled computer code (e.g., bytecode) that is to be executed by a user's computer may be downloaded from an unknown or distrusted computer that compiled the code. Such a situation frequently occurs when a user utilizes the Internet. In this regard, it is common for on-line users of the Internet to download compiled code from distrusted servers and to execute the downloaded code on the user's computer.

Because the downloaded code may not be compiled by a trusted source, it is possible for that code to contain errors that are detectable via proper error checking typically performed during compilation. These errors may be inadvertent, for example, when inadvertent data transmission errors occur during the downloading process, or these errors may be intentional, for example, when a malicious programmer intentionally introduces errors into the code in an attempt to compromise the operation or security of the user's computer. Thus, when compiled computer code is downloaded to a user's computer for execution on the user's computer, it is often desirable to check the code to ensure that the code does not contain certain potential data errors, particularly when the compiled code is downloaded from a distrusted source. Such checking is sometimes referred to as "code verification" or "code validation" and is normally performed before the downloaded code is executed.

Note that cryptographic signing of code may be utilized to identify whether or not downloaded code has been transmitted from a trusted source. In this regard, if downloaded code has been signed by a source that the user's computer recognizes as a trusted source, then performing code verification on the downloaded code may not be necessary. However, if the downloaded code does not include such a signature, then it may be desirable for the user's computer to perform code verification on the code before executing the code.

An important test typically performed by code verification is type checking. In type checking, code is analyzed to ensure that each consuming instruction of the code will at least be provided with inputs (e.g., arguments) of the correct type. In this regard, it is well known that values processed by a computer are typically assigned a type and that certain instructions should only execute based on particular types of inputs. Typical examples of different value types include, but are not limited to, "Int," "Float," "Double," "String," etc. As an example, an add instruction may require two "Int" inputs for execution. If during execution, the add instruction is provided an input of a different type (e.g., "double"), an execution error may occur. Thus, in type checking, potential errors caused by instructions being provided wrong types of inputs are detected.

Note that in object-oriented programming languages (e.g., C++ or JAVA), a value type may be a class that is defined within the program. Further, a class may be extended or derived by various subclasses. If an instruction should receive an input of a particular class during execution, then an error should not occur if the instruction is provided an argument of the particular class or of a sub-class of the particular class. However, if it is determined in performing code verification that the instruction, when executed, will be provided with an input of a different class or type, then the code verification process should detect a potential type error. Otherwise, the instruction should pass the type checking performed by the code verification process.

In conventional computers, code verification of compiled code is often achieved by performing a symbolic execution (i.e., a simulation) of the compiled code before actually executing the code During symbolic execution, determinations are often made as to which types of values are symbolically pulled from and pushed to the computer's memory stack for each symbolically executed instruction. An error is detected during execution if an instruction is provided with a wrong type of input during the symbolic execution.

Compiled code can be verified using an abstract syntax tree (hereinafter referred to as an "AST"), as described in U.S. Pat. No. 6,594,783, entitled "Code Verification by Tree Reconstruction," which is incorporated herein by reference. The application describes and claims code verification accomplished by creating a treelike representation of a code sequence, which includes reassembling the code sequence into a plurality of instructions, combining the instructions into a plurality of blocks, examining the blocks to determine entry points of a plurality of loops, and tagging locations in the series of instructions where control is. The tagged locations in the series of instructions are then used to generate a plurality of control structures (hereinafter referred to as a "coarse tree"). Finally, the instructions, blocks, loops, tagged locations and control structures are examined to generate a plurality of form expressions (hereinafter referred to as the "fine structures").

Compiled code is often verified via type inference, wherein a code verifier analyzes instructions of the compiled code and generates a plurality of type signatures based on the instructions. The type signatures indicate the input type constraints and the output type descriptions of the instructions. The code verifier analyzes the type signatures to detect a type error.

SUMMARY OF THE DISCLOSURE

Generally, the present disclosure provides a code verification system and method for type checking compiled code.

In architecture, an embodiment of present disclosure encompasses a system that comprises memory for storing a compiled program and logic. The logic is configured to translate the compiled program into a set of human-readable instructions and construct a coarse tree representing the program flow of the set of human-readable instructions. Further, the logic is configured to compute a first type signature representative of a code construct comprising alternative code paths within the program flow and determine a second type signature representative of the coarse tree based upon the first type signature.

Another embodiment of the present disclosure is a method comprising the steps of storing a compiled program, translating the program into a set of human-readable instructions, and constructing a coarse tree representing the program flow of the set of human-readable instructions. The method further comprises computing a first type signature representative of a code construct comprising alternative code paths within the program flow and determining a second type signature representative of the coarse tree based upon the first type signature.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 19G is a flowchart illustrating an exemplary signature computation for loop nodes performed by the code verifier of FIG. 1.

DETAILED DESCRIPTION

In general, the present disclosure pertains to an efficient code verification system and method. A code verification system in accordance with an exemplary embodiment of the present disclosure creates a coarse tree indicative of the bytecode of a compiled program. More specifically, the coarse tree created by the code verification system is preferably a treelike representation of the bytecode of a compiled program that comprises blocks of instructions indicative of the program flow of the bytecode. Each block of the coarse tree specifies the sub-components of each structure contained within the source code and the way in which the sub-components are combined.

After the code verification system creates the coarse tree representative of the bytecode of the compiled program, it then creates a type signature for each instruction within each block of code. As used herein, a "type signature" of an instruction is a set of information that indicates the input type constraints and the output type description of the instruction. The input type constraints indicate the types of inputs, if any, that are required for proper execution of the instruction, and the output type description indicates the types of output values, if any, that are produced via execution of the instruction. After formation of the type signatures for the instructions of the code, the type signatures of consecutively executed blocks are composed together and the composed signatures of instruction blocks of alternatively executed code branches are merged. A signature is then translated from the composed and merged signatures to create a signature representative of the entire coarse tree. The coarse tree signature is then checked for type inconsistencies. If no type inconsistencies are detected, then the composition and/or merger of the signatures are allowed to complete successfully. However, if any type inconsistencies are detected, then an indication is generated that the code fails the code verification process, and execution of the code is preferably prevented.

Figure 1:
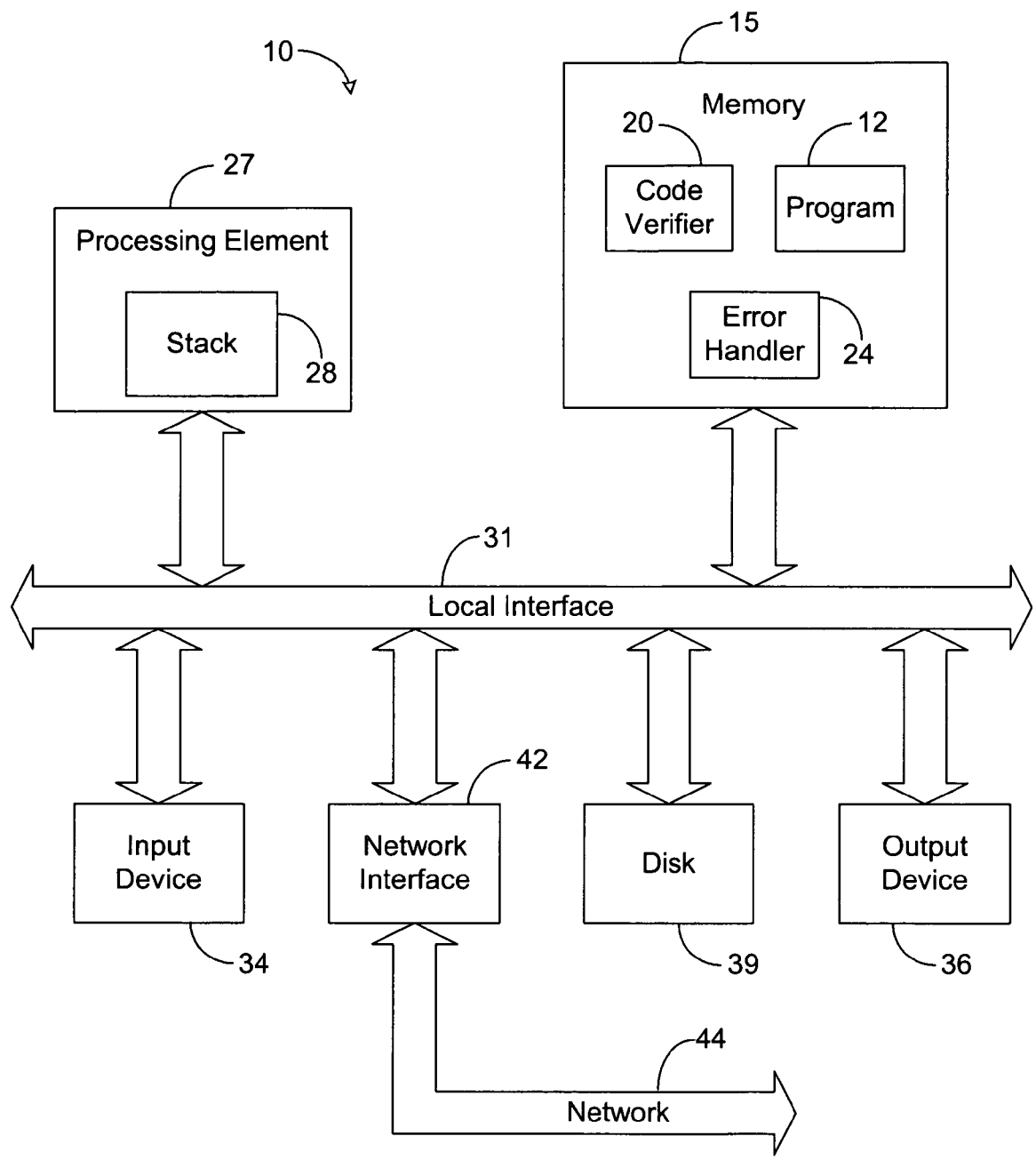
FIG. 1 is a block diagram illustrating an exemplary code verification system in accordance with one embodiment of the present disclosure.

FIG. 1 depicts a computer system 10 in accordance with one exemplary embodiment of the present disclosure. The system 10 comprises a compiled program 12 (e.g., bytecode) stored in memory 15. The program 12 may have been compiled by another system (not shown) and downloaded into the system 10 via well-known techniques. Thus, it may be desirable to perform code verification on the program 12. To this end, a code verifier 20 is configured to perform code verification on the program 12 and, more specifically, the code verifier 20 is configured to create a coarse tree based on the program 12 and analyze the coarse tree for any detectable type errors. If such an error is detected, the code verifier 20 preferably invokes an error handler 24, which handles the error according to a predefined algorithm.

The code verifier 20 and the error handler 24 can be implemented in software, hardware, or any combination thereof. In an exemplary embodiment, as illustrated by way of example in FIG. 1, the code verifier 20 and the error handler 24, along with their associated methodologies, are implemented in software and stored in memory 15.

Note that the code verifier 20 and/or the error handler 24, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the code verifier 20 and/or the error handler 24 may be magnetically stored and transported on a conventional portable computer diskette or compact disk read-only memory (CDROM The system 10 of FIG. 1 comprises one or more conventional processing elements 27, such as a digital signal processor (DSP) or a central processing unit (CPU), for example, that communicate to and drive the other elements within the system 10 via a local interface 31, which can include one or more buses. The processing element 27 may include a last-in, first-out (LIFO) memory element 28, referred to as a "stack," for temporarily storing values being processed by the processing element 27.

The system 10 may also include an input device 34, for example, a keyboard or a mouse, that can be used to input data from a user of the system 10, and an output device 36, for example, a screen display or a printer, can be used to output data to the user. A disk storage mechanism 39 can be connected to the local interface 31 to transfer data to and from a nonvolatile disk (e.g., magnetic, optical, etc.). The system 10 can be connected to a network interface 42 that allows the system 10 to exchange data with a network 44, such as the Internet, for example.

The compiled program 12 is a sequence of instructions. An instruction consists of an operator and a sequence of zero or more operands. The operator specifies an operation to be executed by computer system 10, and an operand specifies a value to be used by the operation. An operand may specify a location in the machine's memory, or in the code sequence, and the operation may require that the specified location contain a particular type of value (e.g., integer, double, etc.). If the specified location does not contain the correct value, then the operation may have an undefined effect or cause a type error when the instruction is executed.

Figure 2:
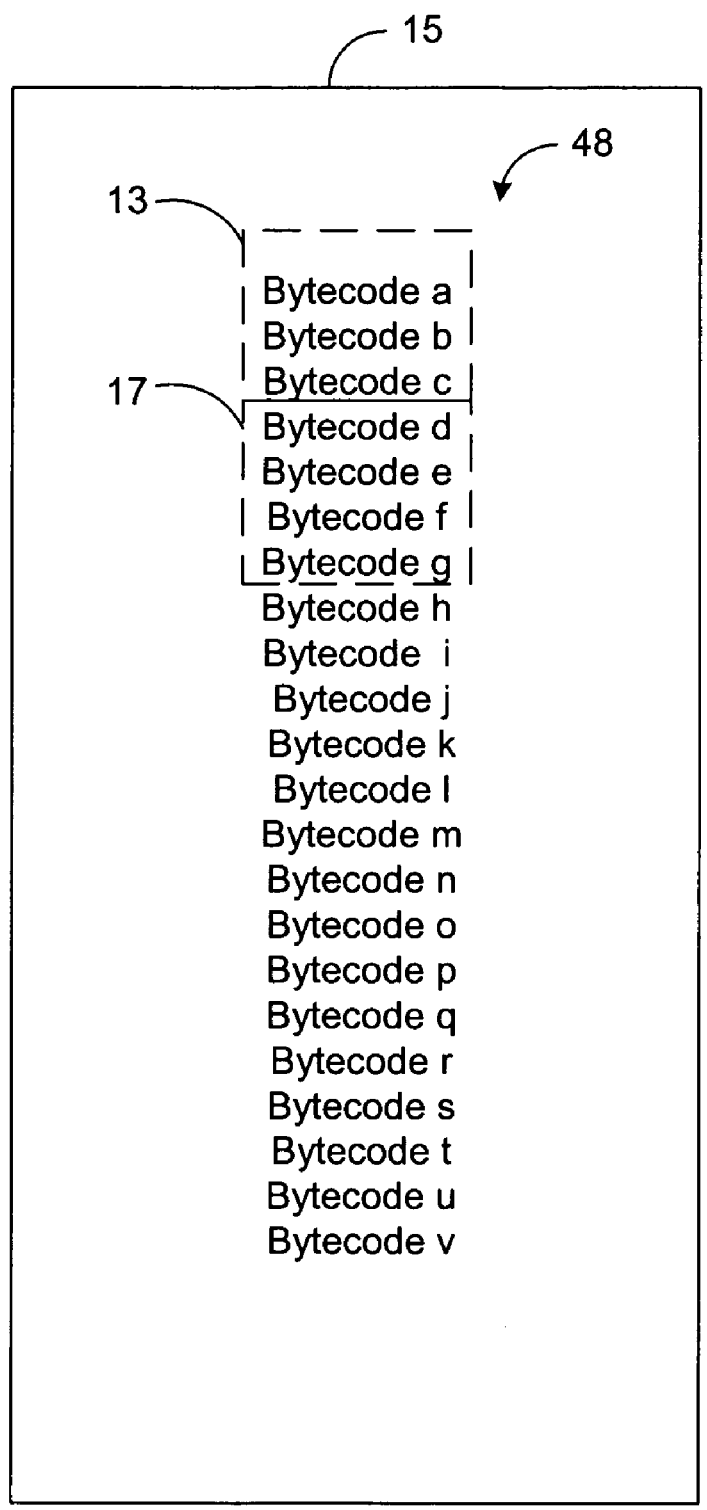
FIG. 2 is a block diagram illustrating the compiled computer code stored in memory within the system of FIG. 1.

FIG. 2 depicts a detailed view of the bytecode 48 that comprises the compiled program 12. It is well known that a program 12 is typically comprised of parts known as "methods," "functions," or "procedures," and the bytecode 48 is one such part. Moreover, well-known techniques for checking the invocation of such parts currently exist, and the present disclosure generally pertains to checking the code within such parts for type errors.

Note that the bytecode 48 can include any number of bytecode segments. For illustration purposes, the bytecode 48 is shown in FIG. 2 as having twenty-three bytecode segments, a-v, although other numbers of bytecode segments are possible in other embodiments. The bytecode 48 represents instructions and instruction operands of the compiled program 12, and each instruction represented by the bytecode 48 corresponds to a sequence of one or more bytecode segments. In this regard, the corresponding sequence comprises at least one bytecode segment and indicates the instruction type of the corresponding instruction. The sequence may also comprise additional bytecode segments indicating instructions' operands. For example, the bytecode sequence 13 including "Bytecode a," "Bytecode b," and "Bytecode c" may correspond to and be representative of a single machine instruction having two operands. In this example, "Bytecode a" may be representative of the instruction type, and "Bytecode b" and "Bytecode c" may represent the operands of the instruction.

To further illustrate the foregoing, assume that the bytecode sequence 17 including "Bytecode d," "Bytecode e," "Bytecode f," and "Bytecode g" is represented as "03 84 00 01." In such an example, bytecode stream 17 comprises four one-byte values. In Java machine language (hereinafter referred to as JVM) the bytecode "03" corresponds to the instruction mnemonic "iconst_0." This instruction requires no operands and pushes an integer "0" onto the stack 28 (FIG. 1) of the processing element 27 (FIG. 1) that executes the instruction. In addition, the bytecode "84" corresponds to the instruction mnemonic "iload_0." This instruction requires two operands, the values of which are represented as "00" and "01" in the foregoing example, and signals the executing processing element to push an integer onto the stack from local variable one. The instruction, for example "03" and "84" indicates the action taken (i.e., push an integer "0" onto the stack or push an integer onto the stack from local variable one).

Note that the bytecode 48 may comprise an exception table, which is preferably a collection of entries (e.g., start, end, handle, and class). The "start" entry may represent the beginning address in a range of the bytecode that is included in the exception table entry, and the "end" entry may indicate the address of the final bytecode in that range.

Further, the "handle" entry may indicate the address of the code to execute when an error occurs within the range "start" to "end."

Figure 3:
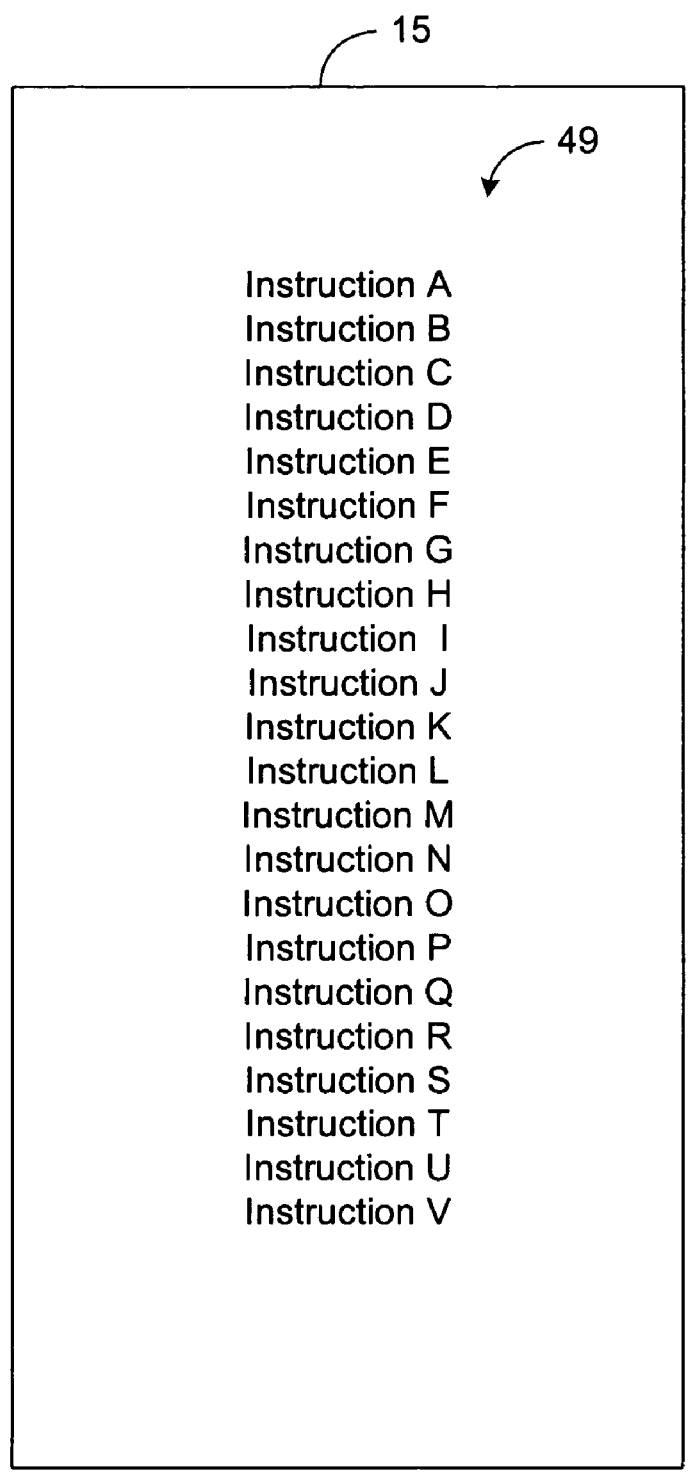
FIG. 3 is a block diagram illustrating the code of FIG. 2 after the code has been translated into machine-readable instructions.

To enable code verification according to the techniques described in more detail hereinafter, the code verifier 20 preferably translates the bytecode 48 into instruction code 49, which is illustrated in FIG. 3. The instruction code is preferably a higher-level representation of the bytecode 48 and is generated in an effort to facilitate type checking, as will be described hereinafter. As an example, the instruction code 49 may be an assembly language representation of the bytecode 48. For example, "Instruction A" may be an assembly language representation of the instruction defined in bytecode.

As shown in FIG. 3, the instruction code 49 preferably includes a plurality of instructions that are represented as instructions A-V. The instructions may comprise any set of compiled instructions from a known programming language (e.g., C, C++, Java, Fortran, etc.). Note that the code 49 can include any number of instructions sufficient for representing the bytecode fragments 48 being verified, and the number of instructions shown in FIG. 3 has been arbitrarily selected for illustrative purposes only.

More specifically, the code verifier 20 translates the bytecode 48 (FIG. 2) representative of the program 12 into a set of instructions 49 (FIG. 3). As an example, instructions representing JVM will be used herein for illustrative purpose. Notably, the instruction code 49 may comprise instructions which operate on local variables L (including machine registers), permanent (i.e., global or static) variables V, constants C, labels H, and procedures (also referred to as functions or methods) P. Machine state may include a stack capable of holding arbitrary (possibly typed) machine values.

For example, the instruction code 49 may comprise the instruction "inconst_0," "inconst_1," or "iconst_2". In JVM, these instructions require no operands and simply push integers 0, 1, or 2 onto the stack, respectively. Other JVM instructions include "istore_1," "return," and "goto." An inclusive listing of JVM opcode mnemonics definitions can be found in *The Java™ Virtual Machine Specification* by Tim Lindholm and Frank Yellin, published by SUN Microsystems, Inc., 1999.

Figure 4:
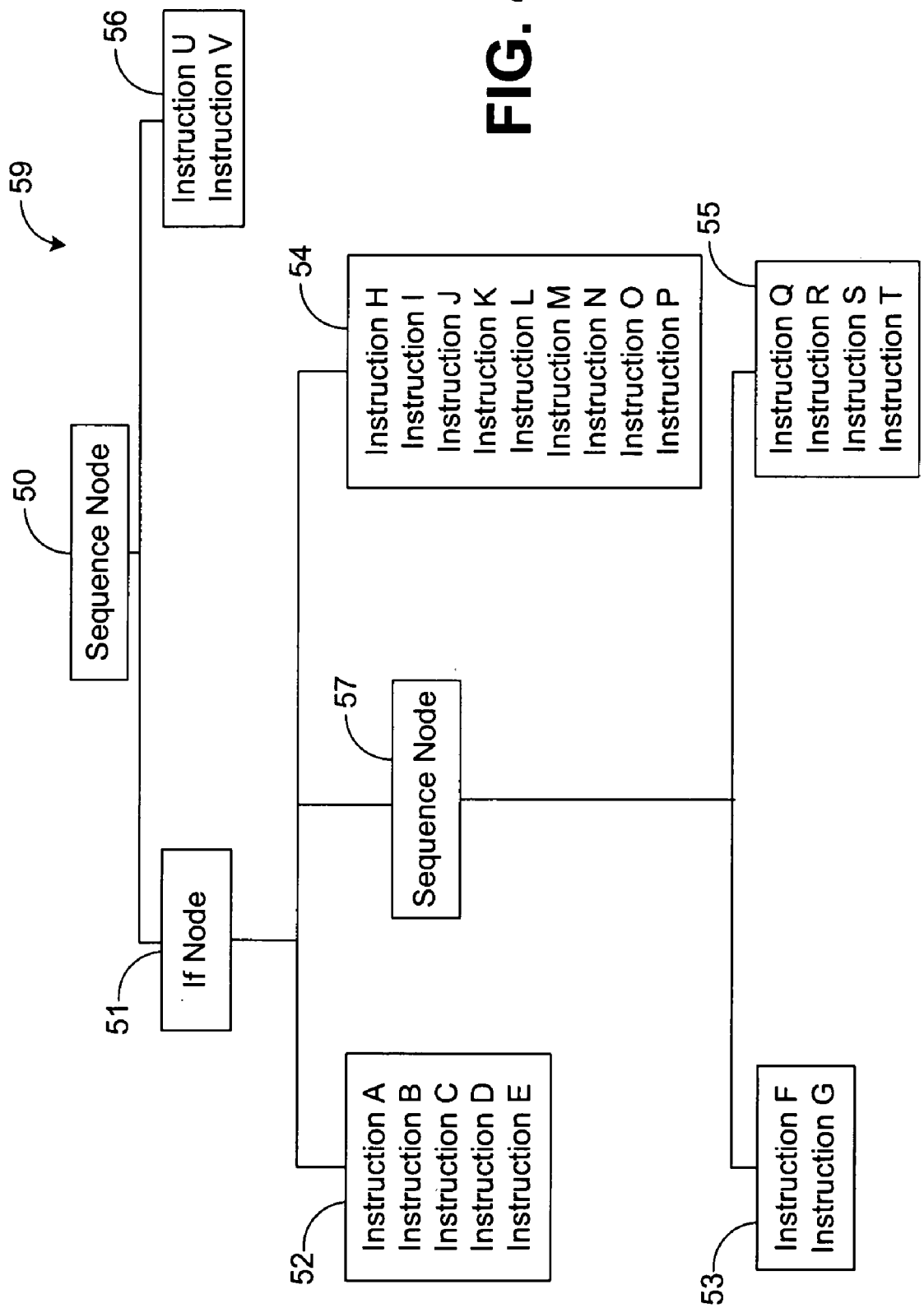
FIG. 4 is a block diagram illustrating the instructions of FIG. 3 after the code verifier of FIG. 1 has subdivided the code and created a coarse tree.

The code verifier 20 preferably partitions the code 49 into a plurality of blocks 50-57, as illustrated in FIG. 4, which creates the coarse tree 59 based on the determined program flow. An exemplary architecture and functionality of the code verifier 20 related to the creation of the coarse tree will now be discussed with reference to FIG. 5 through FIG. 11.

As will be discussed herein, the coarse tree created by the code verifier 20 can take varying forms. For example, the coarse tree can be represented in a textual form, which is described in more detail with reference to FIG. 11C, or it can be represented in graphical form, which is described in more detail with reference to FIG. 11D. Therefore, with respect to the graphical representation of the coarse tree, a block of instructions 50-57 (FIG. 4) can be represented graphically by a node of a tree and children that extend from the node, which is dictated by the construct that is represented by the node.

Note that each of the blocks 50-57 that comprise the coarse tree may be created by recursive composition. Recursive composition is the derivation of a single coarse tree block by combining the sub-components of a code sequence plus some number of modification operations that preserve the meaning of the code sequence. For example, each instruction code block 50-57 may represent a program construct, for example an "if-then-else" construct, a "switch" construct, or a "loop" construct, that consumes some number of values that arise from the construct's operands and delivers some number of results, which will be used by the instruction code block of which the construct is a part.

The code verifier 20 reconstructs the compiled program 12 by systematically discovering the coarse tree 59 that preferably corresponds to the compiled program 12. If such a coarse tree 59 is found, the code verifier 20 verifies the coarse tree 59 to determine whether the execution of the coarse tree 59 would give rise to undefined behavior or type errors.

Note that a conditional branch instruction, during execution, causes the program flow to branch to one of a plurality of possible instructions, depending on the machine state of system 10 at run time. Thus, during the code verification process, which occurs before runtime, it cannot be determined which instruction will successively execute, at run time, after a conditional branch instruction. Therefore, if a block 52-56 includes a conditional branch instruction, then the block 52-56 is preferably defined (i.e., the boundaries of the block 52-56 are preferably set) such that the conditional branch instruction is the last instruction of the block 52-56. Moreover, to ensure that each of the code blocks 52-56 includes only successive instructions, any single code block 52-56 preferably does not include more than one conditional branch instruction.

Moreover, in order to accurately represent the flow of program, the code verifier creates a coarse tree 59 that comprises blocks of instructions, where each block terminates where a transfer of control is made from the current address of the code to another address in the code. The coarse tree 59 may represent consecutive code execution with consecutive blocks of instructions, and the coarse tree 59 may represent branches of alternative code execution containing raw nodes. For example, if there is an if-node in the program 12, then there are two possible paths for code execution. When the "if" condition is met, a first code path is executed. However, when the "if" condition is not met, a second code path is executed. In this regard, the coarse tree 59 represents the first code path stemming from an if-node as alternative consecutive blocks of instructions and the second code path stemming from the if-node as consecutive blocks of instructions.

Figure 5:
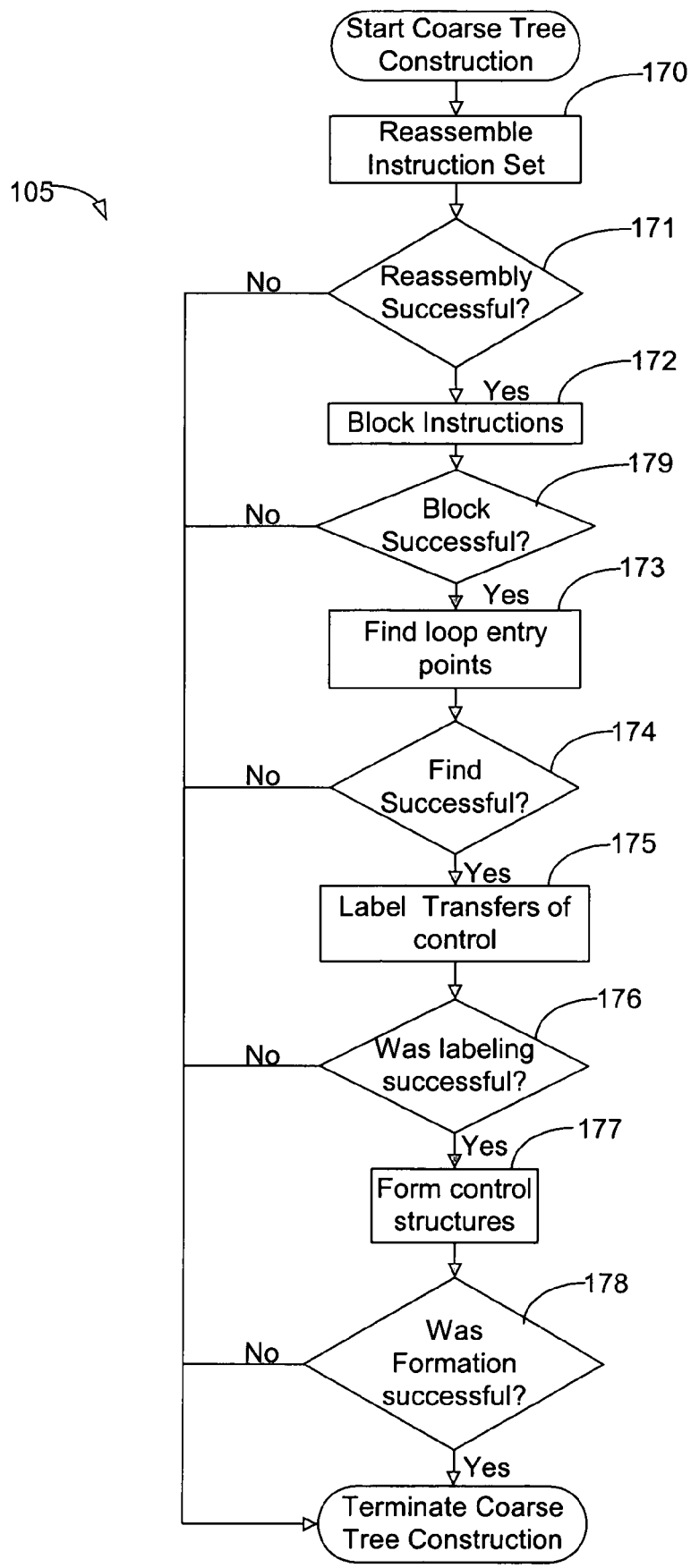
FIG. 5 is a flowchart illustrating an exemplary coarse tree construction performed by the code verifier depicted in FIG. 1.

With reference to FIG. 5, the code verifier 20 (FIG. 1) creates a coarse tree, for example the coarse tree 59 (FIG. 4), by reassembling an instruction set, for example instruction set 49 (FIG. 3), as indicated in block 170. If the re-assembly successfully completes without error, the code verifier 20 then creates blocks of instructions defined by the code, as indicated in block 172. The code verifier 20 may analyze the blocks to find loop entry points, as indicated by block 173, and then label all transfers of control, as indicated by block 175. Finally, the code verifier 20 may form control structures, as indicated by block 177. Each of these steps is described in more detail hereafter with reference to FIG. 6 through FIG. 11.

Figure 6:
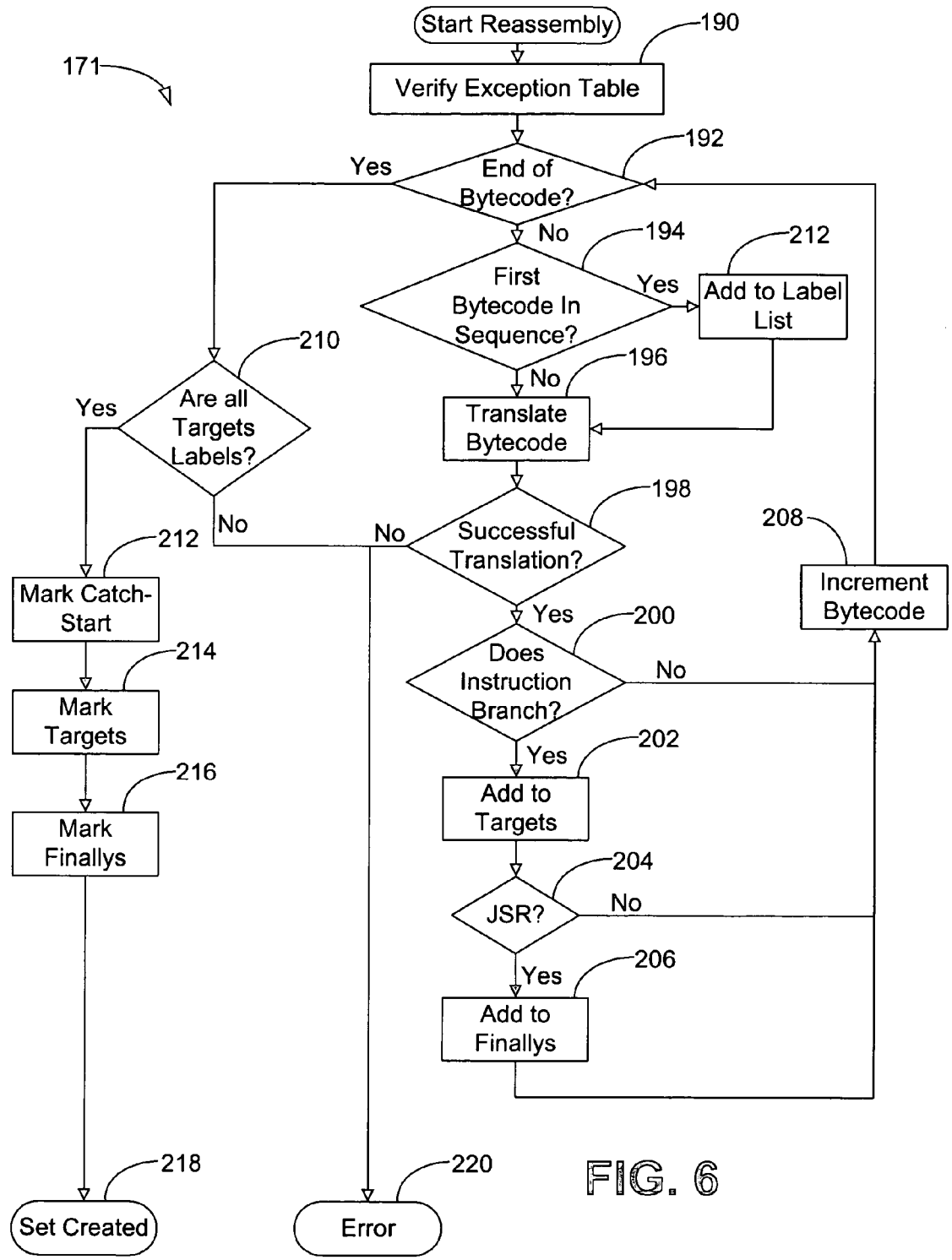
FIG. 6 is a flowchart illustrating an re-assembly performed by the code verifier depicted in FIG. 1.

FIG. 6 illustrates a re-assembly pass of the code verifier 20 when constructing a coarse tree 59. Re-assembly is the translation of bytecode into meaningful instructions, for example, translating a bytecode stream into JVM instructions.

The compiled program 12 (FIG. 1) is represented as a sequence of bytecodes (FIG. 2), which are integer values or 8-bit bytecodes, as described above. The code verifier 10 reassembles the contiguous integer sequence into an instruction sequence using definitions of the machine instructions. Note that if any instruction that is defined to refer to another instruction in the same code sequence does not in fact so refer (e.g., it refers to a location outside the code sequence, or to a location within an instruction), or if the bytecode stream cannot be reassembled into instructions, the code verifier 20 (FIG. 1) fails to verify the program 12 (FIG. 1).

In the re-assembly process 170, the exception table for the bytecode is first verified as indicated in block 190. If the exception table is invalid, verification fails. To be valid, the exception table preferably satisfies a given set of conditions. For example, a "start" entry and a "handle" entry preferably refer to addresses in the bytecode stream 48 that are being translated, and an "end" entry to a bytecode sequence is the address just past a bytecode sequence. Note that ranges of bytecode may overlap if one completely includes the other. Also, two entries with equal (start, end) pairs cannot have the same class. If these conditions are satisfied, then the ranges nest properly and each range has at most one handler for any given class value.

The re-assembly process is preferably a traversal of the bytecode stream, in which each bytecode is taken and analyzed in consecutive order. Therefore, if all bytecodes have been translated to instruction code, then the re-assembly process 170 determines whether all "targets" are "labels," as indicated in block 210. Targets include addresses to which there is a transfer of control from one bytecode address to another in the bytecode stream during execution of program 12 (FIG. 1). Labels include those addresses of the bytecodes to which control is transferred in the bytecode stream during execution of the program 12 (FIG. 1). Instructions in the reassembled sequence are said to be labeled, meaning that control can be transferred directly to those instructions when some other instruction branches to it, it follows a conditional branch instruction, it is the first instruction in compiled program 12, or it is referred to by a start, end, or handle of an exception table entry. Therefore, in order for the re-assembly to be valid in a preferred embodiment, all addresses to which control is to be transferred should be included in all addresses to which control can be transferred. If this is not the case, then the re-assembly process terminates in step 220 in error. If, however, all "targets" are included in "labels," then the re-assembly process 170 continues to block 212.

Steps 212, 214 and 216 indicate that the re-assembly process 170 marks special instructions with identifiers that are subsequently used by the code verifier 20 for type checking. In step 212, all instructions that are defined as catch-start instructions are marked. A catch-start instruction is a type of event handler and affects the program flow at runtime. If there is an exception during runtime of a program 12 for which there is a catch block, then control of the program is transferred to an identified block of code, which executes in a way to handle the exception that has occurred. For example, the "catch" block of code to which control is transferred may exit from the program altogether. Marking "catch" instructions provides identification for the code verifier 10 in the coarse tree construction that there is a potential transfer of control at the marked instruction.

As indicated in step 214, the re-assembly process 170 marks all "target" instructions. As discussed herein, in determining program flow, "target" instructions contain potential transfers of control of the program and thus interrupt the consecutive flow from instruction to instruction or block to block of the program 12. The re-assembly process 170 successfully terminates, as indicated by step 218, with an instruction set.

If it is not the end of the bytecode, then the code verifier 20 determines whether the bytecode is the first bytecode in a sequence of bytecodes that pertain to a single instruction in step 194. If it is the first bytecode in a sequence, then the current bytecode is a label, and the re-assembly process 170 adds the current bytecode to a label list. The bytecode is then translated into an instruction code in block 196. Translation of the bytecode is the association of the current bytecode with its appropriate instruction mnemonic, for example bytecode "03" is associated with instruction mnemonic "iconst_0."

If the re-assembly process 170 of the code verifier 20 is unable to locate an instruction for the given bytecode, then the re-assembly process 170 ends in error in block 220. If the instruction associated with the bytecode branches to an address in block 200, then the address to which it branches is added to the list of targets as indicated in block 202. If the instruction is a Java sub-routine (hereinafter referred to as JSR), as indicated in block 204, then the address is further added to the list of finallys, as indicated in block 206. Notably, "finallys" is a Java keyword, which signals a set of code that will execute no matter what path execution takes during, for example, a "try-catch" block, described further hereafter.

The re-assembly process 170 of the code verifier 20 then increments the bytecode, as indicated in block 208.

Figure 7:
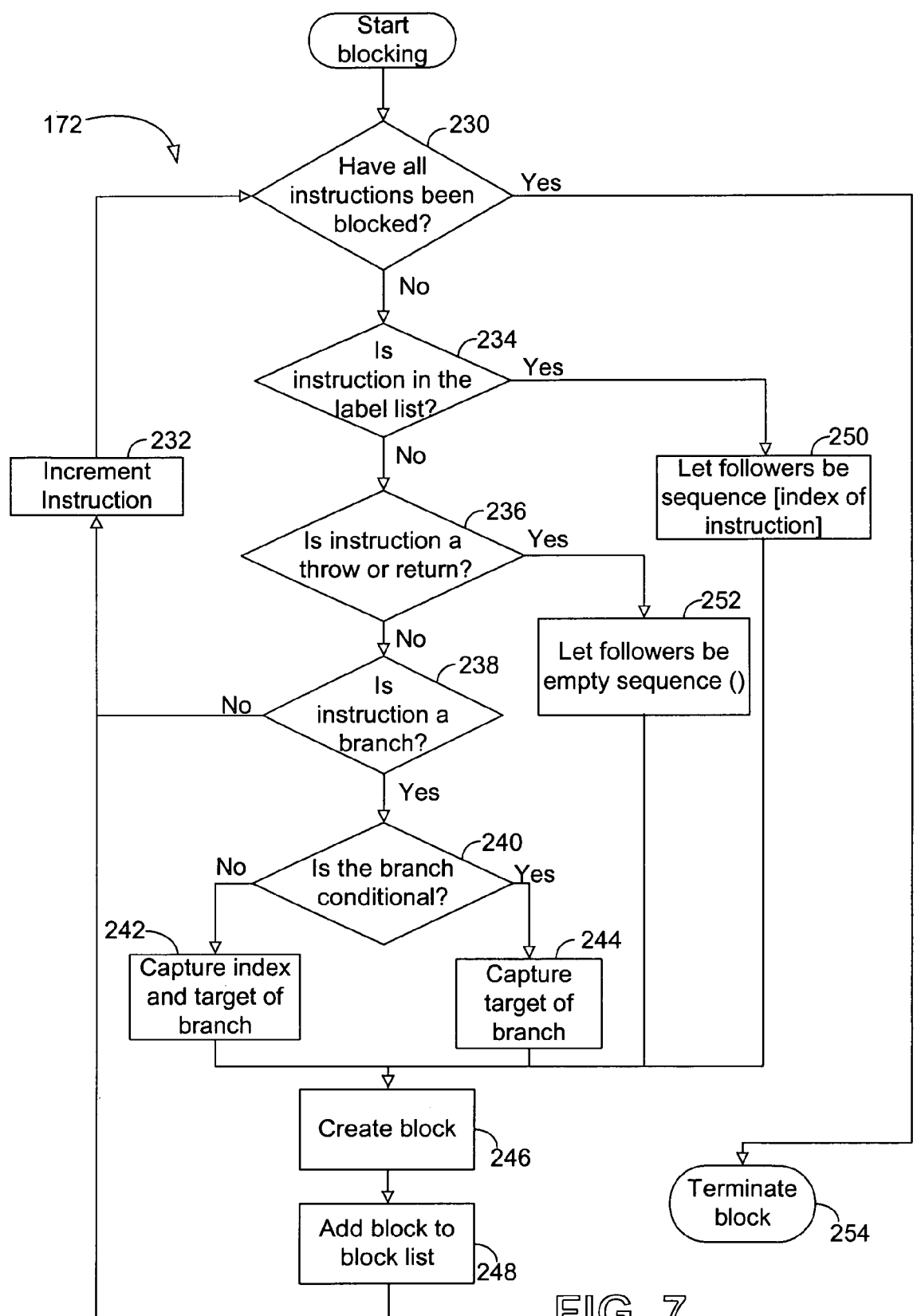
FIG. 7 is a flowchart illustrating an code blocking performed by the code verifier depicted in FIG. 1.

FIG. 7 illustrates a blocking pass 172 of the coarse tree construction process 105 of FIG. 5 of the code verifier 20. The blocking pass 172 converts the instruction sequence reassembled from the re-assembly process 170 from the previous pass into a block sequence, such as the one illustrated in FIG. 4. Blocks are sequences of instructions which start with a labeled instruction and which contain no internal transfers, transfers of control to another block, a return, or a throw. A "return" or a "transfer" is simply an instruction that unconditionally transfers control to another address in the program, thereby interrupting program flow.

Each block has associated with it a sequence of followers or an empty set of followers. A follower is a reference to a block, annotated with the style of the reference, which is discussed in more detail with reference to the "tagging" process 175 illustrated in FIG. 9. The blocks referenced with the followers are those to which control is transferred.

A block has zero followers if it ends with a return or throw instruction. A block has one follower if it ends in an unconditional transfer of control to another block, or is followed by a labeled instruction. A block has two followers if it ends with a conditional jump to another block, the other follower referring to the block immediately following it. A block has a number of followers if it ends with a "switch" instruction, depending upon the construction of the switch statement.

As indicated in FIG. 7, the "blocking" process 172 is a traversal of the program instructions 49, as indicated in step 230. Each instruction is analyzed by the blocking process 172 to determine whether the instruction is the beginning of a block, transfers control to another instruction or block, or is part of the body of a block. The block that begins with the first instruction in the instruction sequence is called the opening block.

A block that starts with a try instruction is marked as a "try" block. Notably, a "try" code block comprises a block of code, which is "guarded" by the keyword "try." In this regard, the code is referred to as "guarded," because if an exception occurs within the "guarded" code block, then the exception is sent to a designated "catch" block. A "catch" block is simply a block of code that handles the exception received. Thus, transfer of control within the program takes place when an exception occurs from the "try" block of code that is guarded by the "try" keyword to the "catch" block of code that handles the exception. Irregardless of whether the "try" block transfers control to the "catch" block, if there is a "finally" block associated with the "try" block.

As indicated in step 234, if the current instruction is in the label list, then this indicates that the instruction is the first instruction in a block. Therefore, the "followers" of the block are retrieved from the instruction code and placed in a variable "sequence," as indicated in step 250. A new block is created in step 246, and the new block is added to a "block list" in step 248. The blocking process 172 of the code verifier 20 then increments to the next instruction, as indicated in step 232.

If the instruction is not a label, as indicated in block step 234, then the blocking process 172 proceeds to step 236. As indicated in step 236, if the instruction is a throw or a return, then this indicates that there is a transfer of control. Therefore, there are no followers to the instruction as described herein, and the instruction is associated with an empty list of followers, as indicated in step 252. A block is created, as indicated in step 246 with no followers, and the block is added to the "block list," as indicated in step 248.

If the instruction is not a throw or a return in step 236, then the blocking process 172 of the code verifier 20 determines whether the instruction is a branch, as indicated in step 238. If the instruction is not a branch, then a block is created in step 246 and added to the "block list" in step 248. If it is a conditional branch, as indicated in step 240, then the "target" to which the branch is made is associated with the instruction, as indicated in step 242. If it is not a conditional branch then the current index of the instruction and the target to which the branch is made are associated with the instruction, as indicated in step 244. Whether it is a conditional or unconditional branch, a new block is created, because there is a transfer of control to a target address, and the sequential program flow is interrupted. Therefore, a block is created in step 246 and added to the "block list" as indicated in step 248.

Thus, the instructions are separated into groups of instructions or blocks according to the type of instruction in the code. Each block consists of contiguous instructions that are executed consecutively and control remains within the block. When control shifts to a nonconsecutive instruction (i.e., a target address) then a new block is created.

Figure 8:
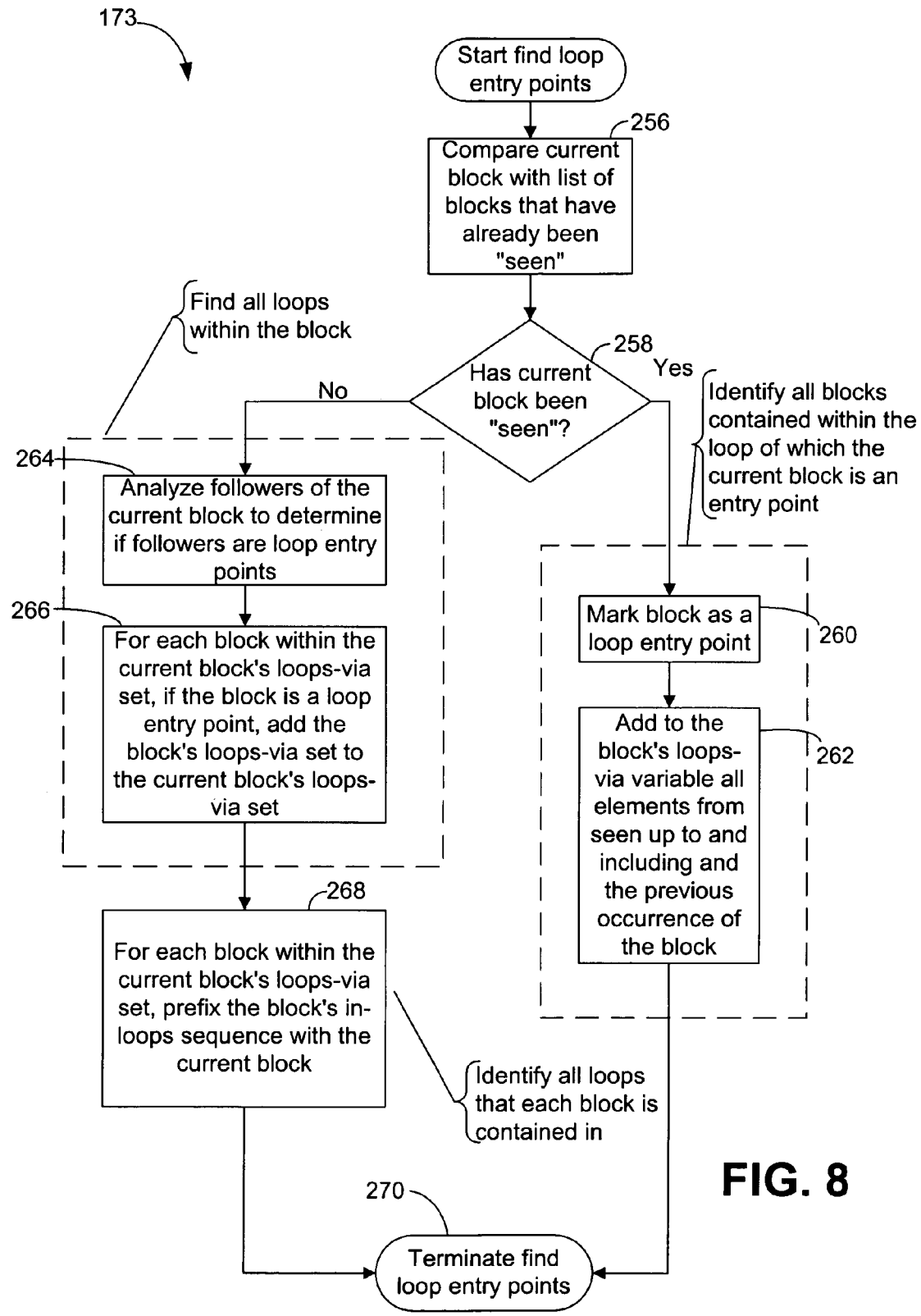
FIG. 8 is a flowchart illustrating an exemplary loop finding at entry points performed by the code verifier depicted in FIG. 1.

FIG. 8 illustrates a loop discovery process 173 of the code verifier 20, which depicts an algorithm preferably executed by code verifier 20 to determine the beginning of a loop in a set of instructions. Specifically, the loop discovery process 173 discovers which blocks are the entry points of loops, and which blocks merely participate in those loops.

Note that each block can be marked as being a loop entry or a loop participant. Associated with each block that is a loop entry point is a list, loops-via list, which refers to a list that contains the address(es) of each block that is contained within its loop. Further note that each block has associated with it an in-loops list, which refers to a list containing the addresses of each loop entry point block in which the block to which the in-loops list is associated, is a participant.

Generally, the loop discovery process is a recursive analysis of the blocks and followers. Beginning with the first block, each block is analyzed. As indicated in step 256, through recursive analysis, a list is kept of the addresses of the blocks that have been identified currently. This is identified in step 256 as blocks that have been "seen." If the block being analyzed has been "seen," as indicated in step 258, then the current block is a loop entry point, and the block is marked as a loop entry point, as indicated in step 260. In addition, all the elements from the last occurrence of the block until the current element are listed in the loops-via list associated with the current block, as indicated in step 262.

If the current block has not yet been "seen," then it is not yet determined in the recursive analysis of the blocks whether the current block is a loop entry point. Therefore, as indicated in step 264, the followers of the block are now analyzed to determine whether the followers are loop entry points. In processing the followers of the current block, each of the blocks that are contained in the current block's loops-via list are analyzed. If a loops-via block of the current block is a loop entry point then the loops-via list of the block's loops-via list is added to the current block's loops-via list, as indicated in step 266. Also, the current block is added to the in-loops list of each of the blocks contained in the current block's loops-via list, as indicated in step 268.

Figure 9:
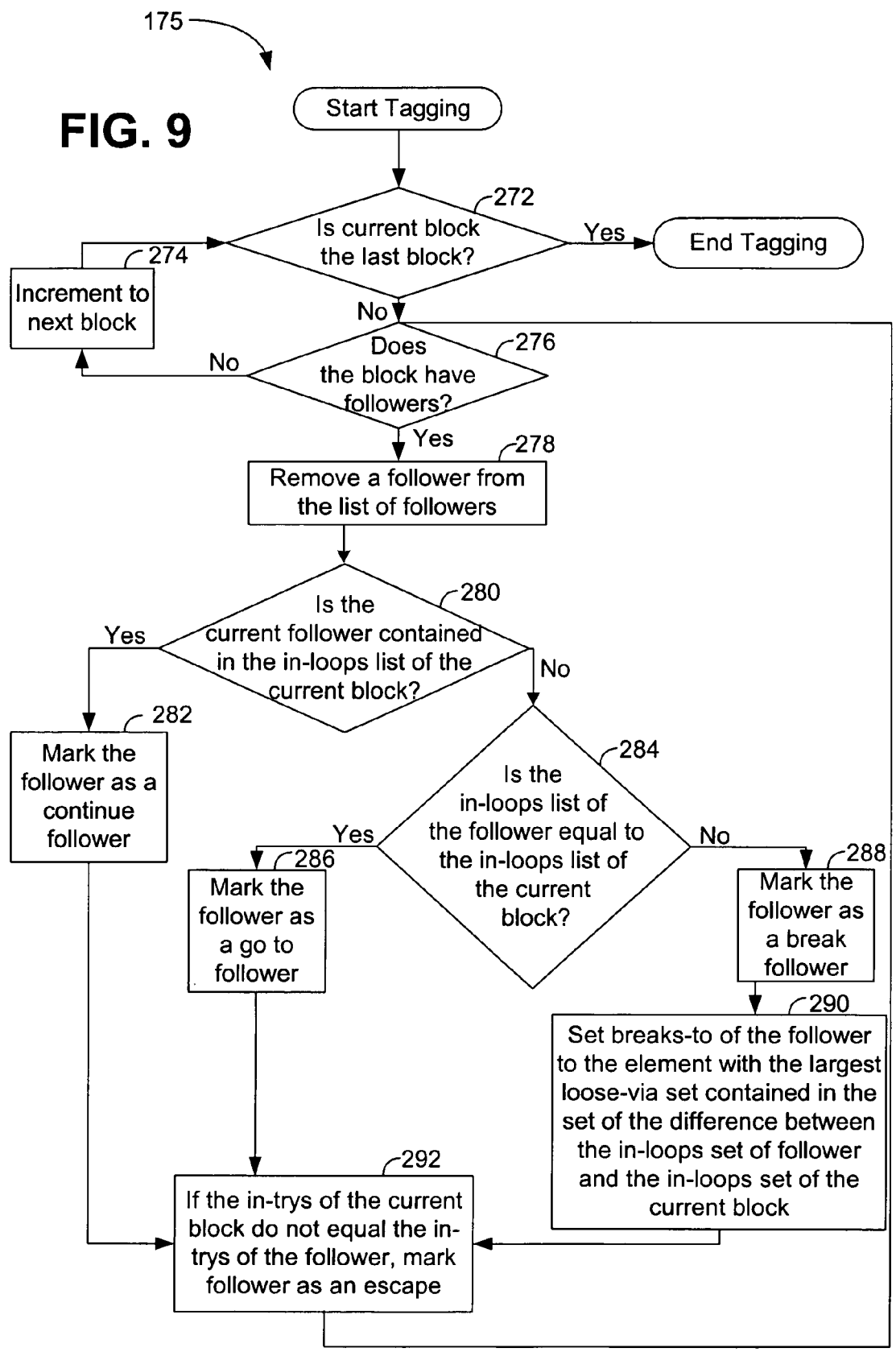
FIG. 9 is a flowchart illustrating an exemplary code tagging performed by the code verifier depicted in FIG. 1.

With reference to FIG. 5, the next step in the coarse tree construction process 105 is tagging all transfers of control, as indicated in step 175. This process is described in more detail with reference to FIG. 9. FIG. 9 illustrates a tagging process 105 of the coarse tree construction. The tagging process 175 annotates the followers of each block with information about the type of transfer of control that it encodes.

The basic tag types include "continue," "break," and "goto" code statements. Each of these may be modified by the escape marker. A "continue-follower" is a transfer to a loop entry, which was marked in the loop entry process 173 of FIG. 8. A "break-follower" is a transfer from the inside of a loop to the outside of a loop. A "goto-follower" is a transfer which is neither a "continue" nor a "break." A follower is an escape when it leaves the control of an exception-handler. "Break-followers" are associated with a "breaks-from" attribute, which will be the loop entry block of the loop from which the follower breaks.

As shown in the tagging process 175 each block within the "block list" is analyzed in the tagging process 175. Generally, the tagging determines per block what type of transfer of control is effectuated within each block. If the process has not yet analyzed all the blocks, as shown in step 272, then the process proceeds to step 276. If the current block does not have followers, then the block is not marked and the next block is analyzed as indicated in step 274. If the block does have followers, then a follower is removed from the list of followers in step 278 and analysis of the removed follower begins in step 280 to determine if the follower is in the current block's in-loops list. If it is in the current block's list, then the follower is a "continue-follower," and the follower is marked as a "continue-follower" in step 282.

If the follower is not in the current block's in-loops list, then the in-loops list of the follower and the current block are compared in step 284. If the in-loops list of the follower and the current block are equal, the follower is marked as a "goto-follower," as indicated in step 286. If they are not equal, then the follower is marked as a "break-follower" in step 288.

When the follower is a "break-follower," then the breaks-to address of the follower is set to the element having the largest loops-via list contained in the set of the difference between the in-loops list of the follower and the in-loops list of the current block, as indicated in step 290.

Whether the follower is marked as a "continue-follower," a "goto-follower," or a "break-follower," if the follower is not contained in the same number of try blocks as the current block, then the follower is marked as an escape, as indicated in step 292.

Figure 10A:
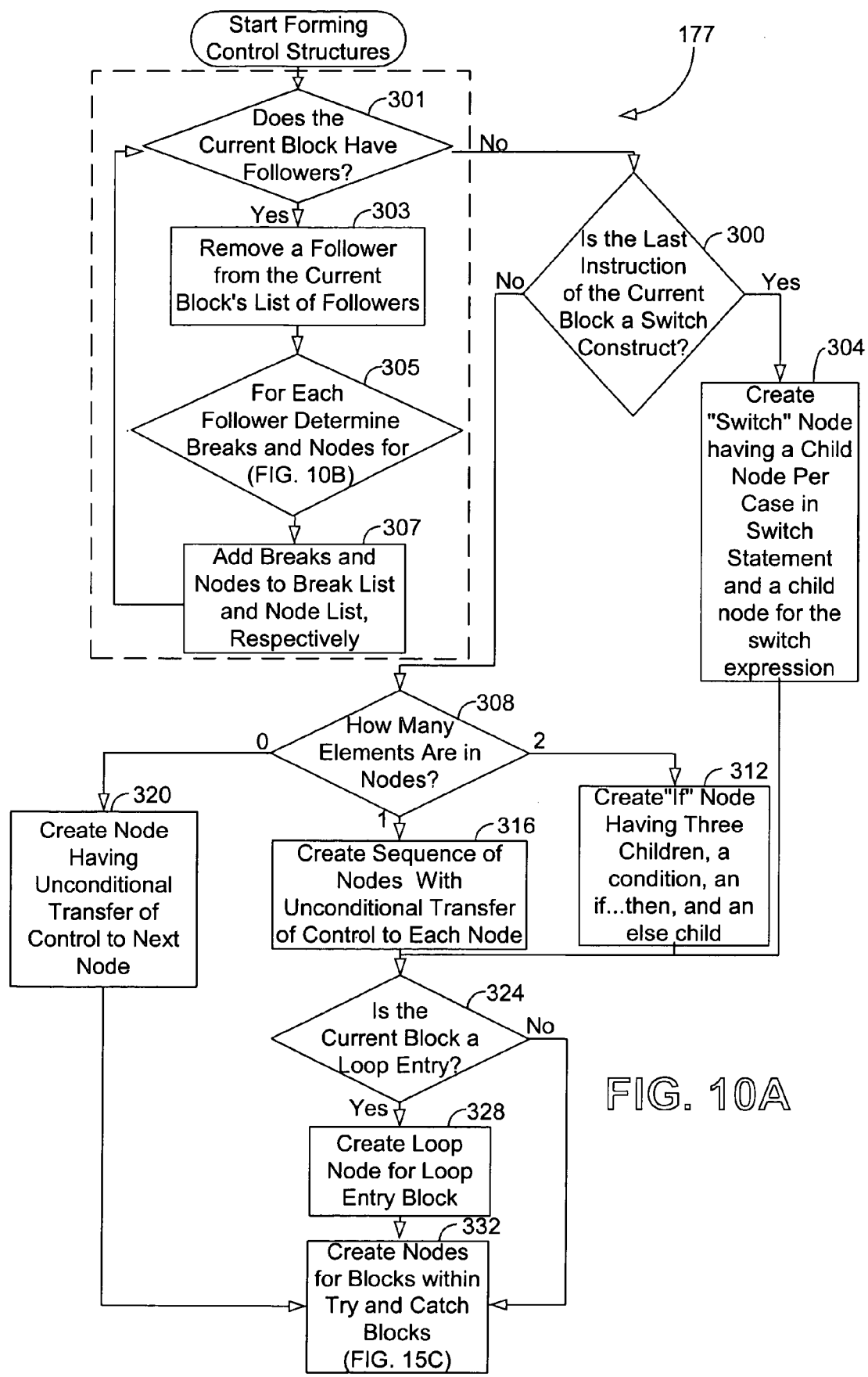
FIG. 10A is a flowchart illustrating an exemplary control structures determination performed by the code verifier depicted in FIG. 1.
Figure 10B:
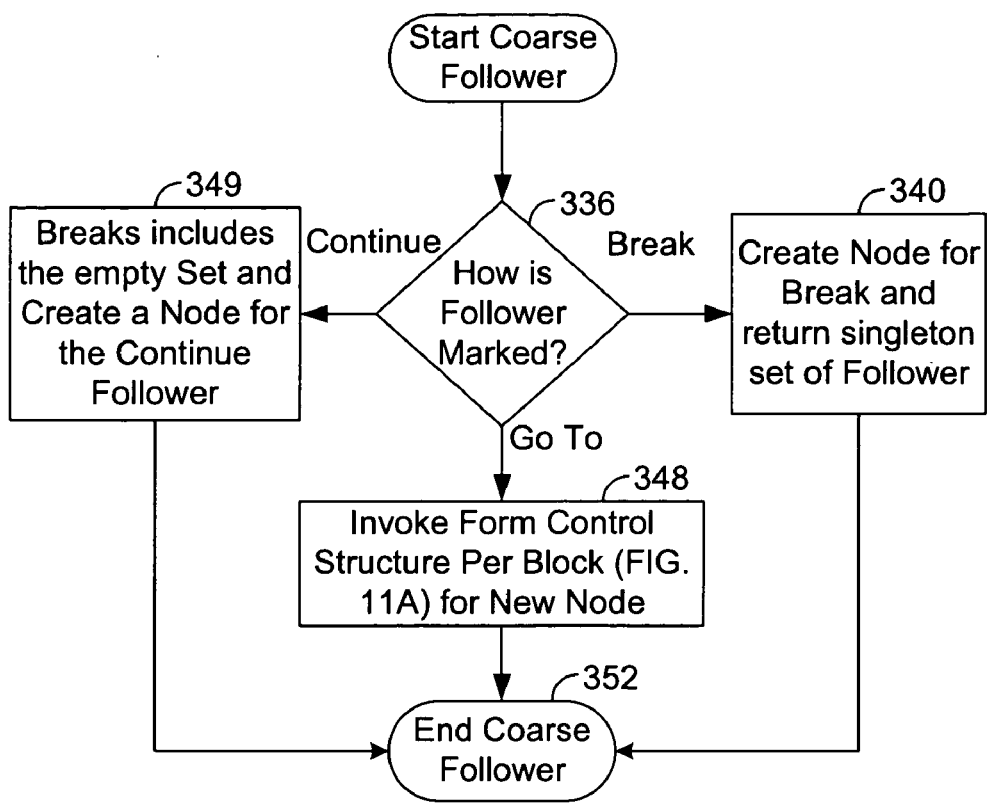
FIG. 10B is a flowchart illustrating an exemplary coarse follower determination performed by the code verifier depicted in FIG. 1.
Figure 10C:
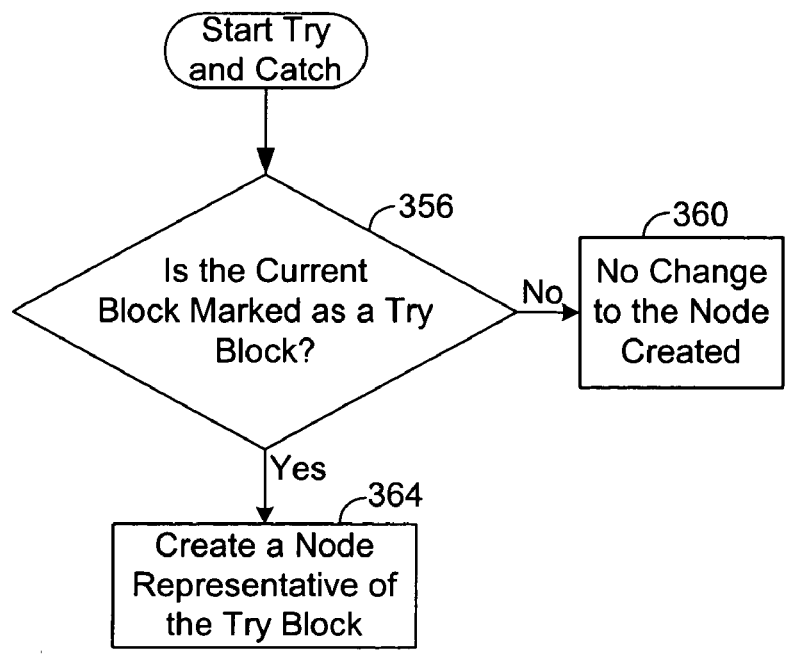
FIG. 10C is a flowchart illustrating an exemplary try and catch determination performed by the code verifier depicted in FIG. 1.
Figure 11:
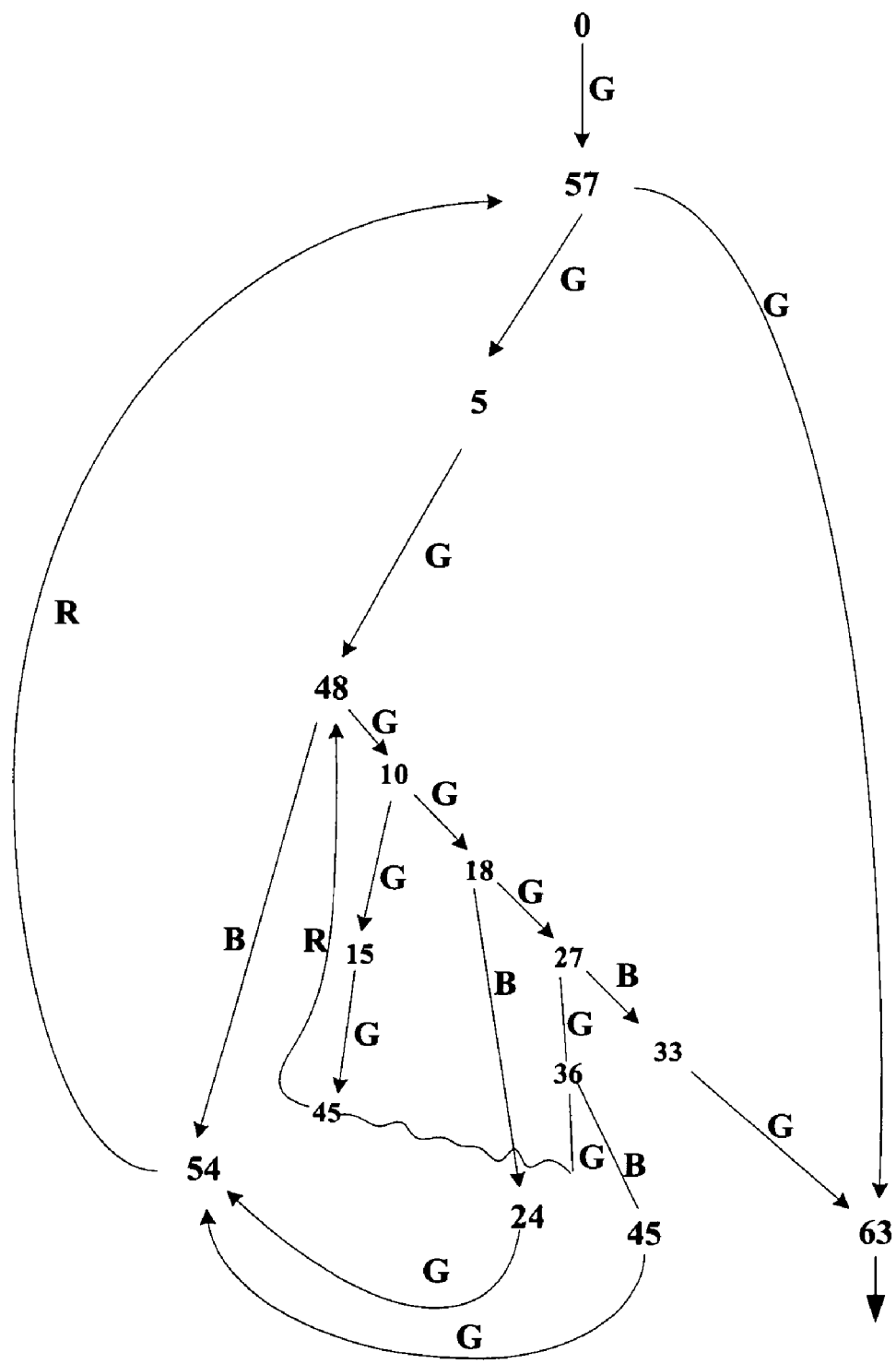
FIG. 11A depicts exemplary computer code prior to its compilation in human-readable form.
FIG. 11B is a representation of the computer code of FIG. 11A after it has been reassembled by the code verifier of FIG. 1.
FIG. 11C is a representation of the reassembled code after it has been labeled and tagged by the code verifier of FIG. 1.
FIG. 11D is a graphical representation of the labeled and tagged representation of the reassembled code of FIG. 11C.
FIG. 11E is a textual representation of the graphical representation of the coarse tree of FIG. 11D.

FIGS. 10A, 10B, and 10C illustrate the control structure forming process 177 of the coarse tree construction 105 of FIG. 5. The forming process 177 constructs the coarse structure of the tree including the control structures but not the expressions. The coarse tree contains only the nodes mentioned above plus "raw" nodes referring to blocks, and a set of breaks, references to blocks which are jumped to by breaks.

The coarse tree is constructed recursively by traversing the annotated blocks and constructing if, and, or, repeat, break, continue, sequence and switch nodes. The structure of the coarse tree is given by the followers of the blocks.

Generally, if a block has one follower and does not end with a switch, then its coarse tree is a sequence of the raw node referring to that block and the coarse tree from structuring that follower including its breaks are the breaks from the follower. If the block has two followers and does not end with a switch, its coarse tree is a conditional node or an "if-then-else." If the block has n followers, because it ends with a switch, its coarse tree is a switch node switch.

With reference to the forming process 177 as illustrated in FIG. 10A, each block is analyzed to determine the control structure for the program flow, as indicated in step 301. If the current block has followers, then a follower is removed from the current block's list of followers and analyzed, as indicated in step 303. Each of the current block's followers is analyzed to determine the break type and number of nodes, as indicated in FIG. 10B.

If the current block does not have followers, then it is determined whether the final instruction in the block is a "switch" instruction, as indicated in step 300. If it is a "switch" statement, then a "switch" node is created in step 304. The "switch" node has a child node per case in the "switch" statement and a child node for the "switch" expression.

If the last instruction in the block is not a "switch" statement, then the number of nodes are analyzed to determine which type of transfer of control is utilized in step 308. If there are no nodes, then there is an unconditional transfer of control from one block to the next (e.g., from one node to the next), as indicated in 320, therefore a node is created indicating such.

If there is one element in the node, then a sequence of nodes is created with unconditional transfer of control between the nodes, as indicated in block 316. If the current block is a loop entry point, as indicated in 324, then a loop node is created in step 328. If it is not a loop entry node, then nodes are created in step 332 for "try" and "catch" transfers of control, described herein.

If there are two nodes, then an "if" node is created in step 312. The "if" node has three children, including a condition node, an "if . . . then" node, and an "else" node.

FIG. 10B illustrates the designation of the followers of the current block from step 305 of FIG. 10A. The "coarse follower" process illustrated in FIG. 10B determines the types of breaks and nodes per each follower. As indicated in block 336, the process determines whether the follower is a "break-follower,", a "continue-follower," or a "goto-follower."

If the follower is a "break-follower," then a node is created for the "break" and a singleton set is associated with the follower. If the follower is a "continue-follower," then the follower has no breaks, and a node for the follower is created, as indicated in block 349. If the follower is a "goto" follower, then the "form control structure" process of FIG. 10A is invoked for a new node to which the "goto" is directed.

FIG. 10C illustrates a process for creating nodes for the "catch-" and "try-blocks," which is invoked from block 332 of FIG. 10A. If the current block is marked as a "try-block," as indicated in 356, a node is created representative of the "try-block," as indicated in 364. If it is not marked as a "try-block," then no change is made to the node, as indicated in 360.

FIG. 11A shows a Java program containing a method "main" comprising two nested loops with various conditional "break" and "continue" commands. The following analysis is an example to illustrate the creation of coarsest control structures for analysis by the remaining portion of the disclosure.

FIG. 11B shows the result of applying the re-assembly process 170 of the coarse tree construction 105 of FIG. 5 to the bytecode of "main." The bytecode illustrated in FIG. 2 is obtained by passing the Java source of FIG. 11A through a Java compiler and extracting the bytecode component from the resulting class file.

The digits before the parenthesis represent the offset of the bytecode from the beginning of the bytecodes, sometimes known as the Java program counter (hereinafter referred to as JPC). The difference between successive JPC values is the width in bytes of the Java virtual machine (hereinafter referred to as JVM) instruction between the two JPCs. The figure in parenthesis is the index of the reassembled instruction.

The text following the instruction is a human-readable representation of the re-assembled instruction. Each "branch" instruction of the re-assembly is annotated with the indexes of the targets of the branch. Note that the conditional branches are annotated with both the index for the case when the condition succeeds and the index for the case when the condition fails.

FIG. 11C illustrates the result of the blocking process 172 of FIG. 5, loop discovery 173 of FIG. 5, and tagging process 175 of FIG. 5 of the coarse tree construction 105 illustrated in FIG. 5 as applied to the re-assembly pass of FIG. 11B.

The digit before the parenthesis is the JPC of the bytecode at which a block starts, and the figure within the parenthesis is the number of re-assembled instructions included within the block. For example, the block starting at "24" is one instruction long, a single branch to "45." The block starting at "45" is itself one instruction long, a single "int."

Following the arrow are the followers of the block, if any, for example the block at JPC 63 has none because it ends with a "return." Each follower is represented by its corresponding JPC value followed by a letter indicating the kind of transfer of control, for example, "R" represents a "continue" transfer of control, "B" represents a "break" transfer of control, and "G" represents a "goto" transfer of control. Thus, the block at JPC "0" has a single follower, a "goto" which transfers control to "57", while the block at JPC "36" has two, a "goto" which transfers to "45" and a "break" which transfers to "42."

The loop information is indicating after the follower information, if any. The loop information is introduced by "L:," and is followed by the JPC value of the starting JPC value of the loop in which this block is involved. For example, with reference to JPC "36," it is within the body of two loops, starting at blocks "57" and "48" respectively.

The blocks "57" and "48" also indicate those loops contained in their loop bodies following the indicator "via:." In this regard, blocks are those discovered in the loop discovery process 80 of the code verification 105. All the blocks of "48" are included in the blocks of "57", which indicates that "48" corresponds to the innermost loop of FIG. 11A.

FIG. 11D shows a graph of the coarse tree structure shown in FIG. 11C. The nodes of the graph are blocks, represented by their JPC value. An arc leads from a node to its followers. The arc is labeled with "G" for a "goto," "B" for a "break," and "R" for a "continue."

The node "63" is the exit from the method of FIG. 11A. It has no followers, therefore, it is grounded. The arc from "36" to "45" is curled purely because it crosses the arc from "18" to "24." The graph representation makes it clear that "48" and "57" are the loop entry points of the method of FIG. 11A.

FIG. 11E is a representation of the results of the coarse structure pass of the method of FIG. 5 applied to the block structure of FIG. 11C. The number at the left is the index of the coarse tree node. The "l" and "%" signs are visual aids to discern groupings of children nodes. The kind of node is indicated by the identifier following the "-" sign, and its children are indented below it.

Thus, the entire tree is a SeqNode(0) with two children, a RawBlockNode(1) and a LoopNode(2). There is an IfNode (16) with its three children, a RawBlockNode(17), a SeqNode(18), and a BreakNode(21). Raw block nodes are annotated with the block and JPC from which each originated.

The type checking of the preferred embodiment of the present disclosure is now initially addressed with brief reference to previously discussed FIG. 4. The coarse tree 59 illustrated in FIG. 4 is preferably created by the coarse tree construction 105 of FIG. 5. The tree 59 includes a sequence node 50 and an if-node 51. The code verifier 20 preferably partitions the code 49 such that each block 52-56 only includes instructions that have no local transfers of control. Thus, if the first instruction of a block 52-56 is executed at run time, then each of the other instructions in the same block 52-56 will successively execute after the first instruction, depending upon any conditional statements.

As an example, FIG. 4 shows a coarse tree 59 that includes a sequence node 50 having two consecutively executed constructs a raw block node 56 and an if-node 51. Note as described herein, a raw block node is representative of a list of sequentially executed instructions.

The if-node block 51 includes three child nodes including a raw block node 52, which represents the conditional statement of the if-node e.g., if x=1, a sequence node 57, which represents the "then" portion of the if-node e.g., then y=2, and a raw block node 54, which represents the "else" portion of the if-node. In the code verification of an exemplary embodiment, the code verifier 20 next performs type checking on the coarse tree created by the aforedescribed coarse tree construction process.

In the example provided in FIG. 4, the if-node construct provides an example of alternate program flow in the then-portion, sequence node 57, and the else-portion, raw block node 54, of the coarse tree. The alternative branches of code in the example provided in FIG. 4, which include the then portion and the else portion of the if-node, are mutually exclusive sequences chosen at run-time based on some value, which may include a variable or relational expression. As shown in FIG. 4, raw block node 52 includes instructions A-E that execute consecutively and that represent the conditional portion of the if-node 51. After the conditional portion 52 is executed, then the code executes the "then" portion, represented by the sequence block 57, or the "else" portion represented by the raw block node 54.

After the code verifier 20 has analyzed the code 49 as described above and created a coarse tree 59 as described above, the code 49 should be subdivided or grouped into a plurality of code blocks 50-57, as shown by FIG. 4. In addition, the coarse tree 59 provides the order that the blocks 52-56 will execute at run time.

Figure 12:
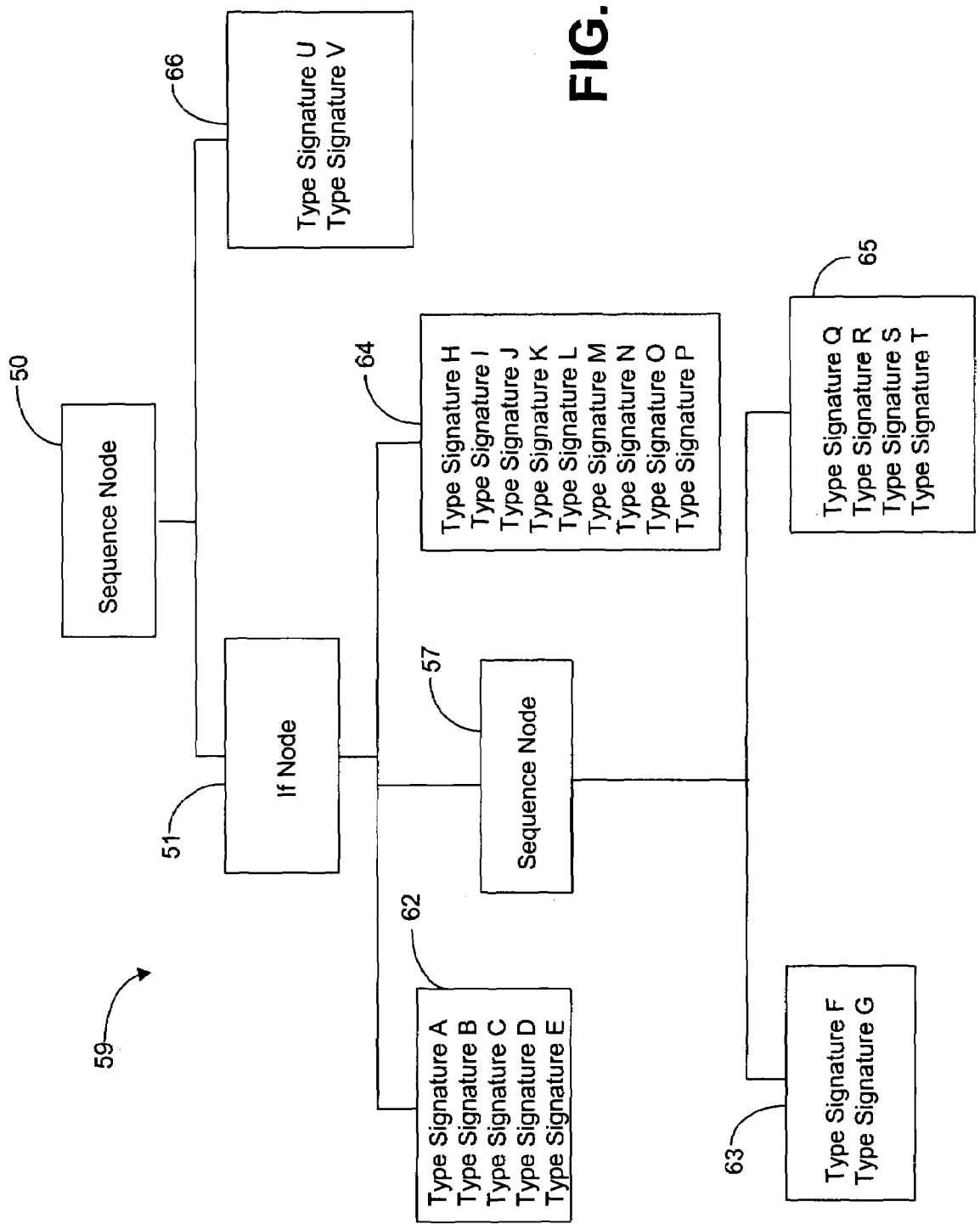
FIG. 12 is a block diagram illustrating the coarse tree of FIG. 4 after the code verifier has created signatures representing the instructions of the program of FIG. 1.

The type checking process is now described with reference to FIG. 12. In order to perform type checking the code verifier 20 analyzes each instruction of a coarse tree and translates the instruction into a type signature indicative of the constructs making up the course tree. As an example, the code verifier 20 translates each instruction in blocks 52-56 (FIG. 4) of the code 49 into a corresponding type signature of the instruction, as illustrated in FIG. 12. Thus, the code blocks 52-56 are translated into type signature blocks 62-66, which are depicted in FIG. 12.

Figure 13:
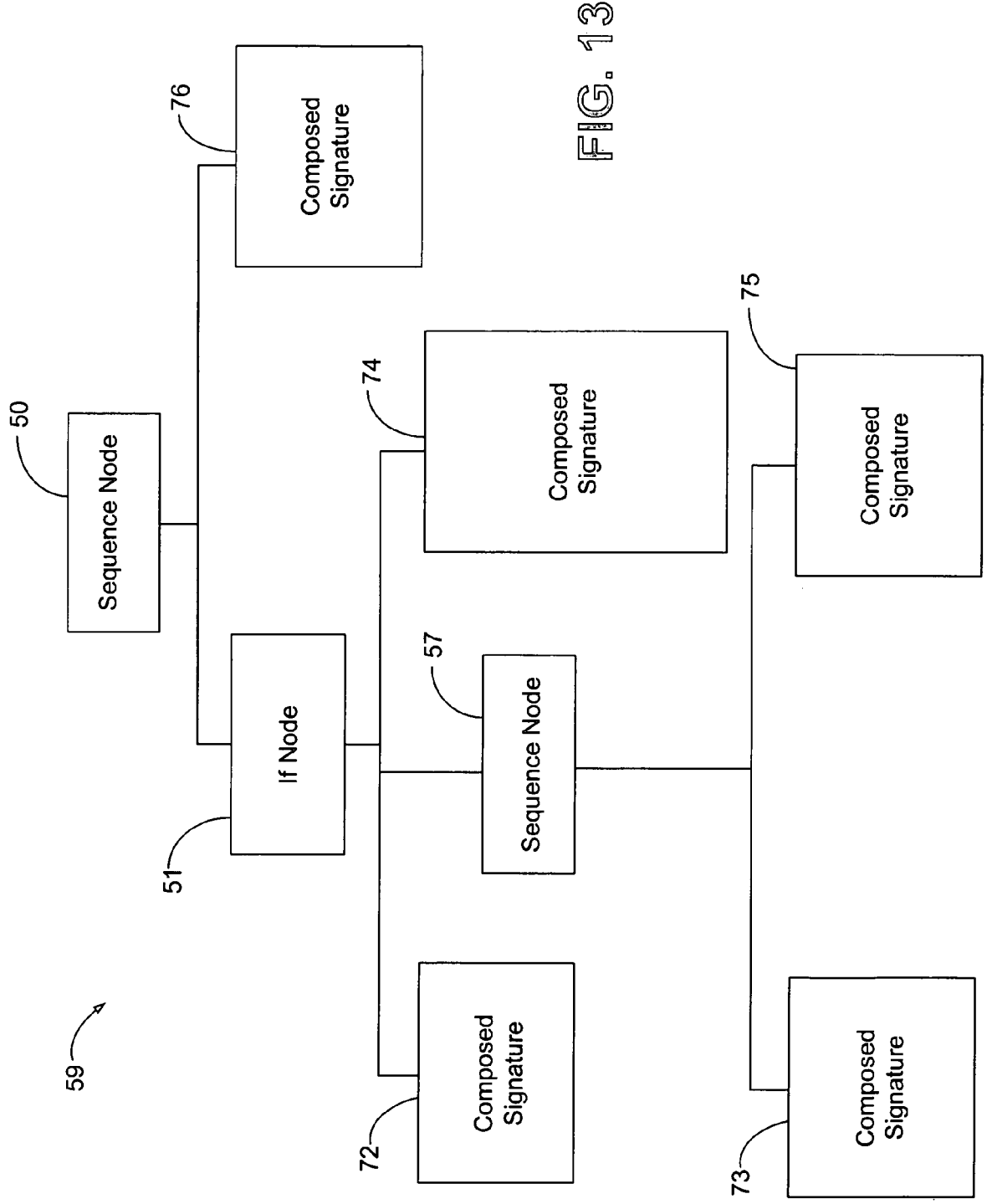
FIG. 13 is a block diagram illustrating the coarse tree of FIG. 12 after the code verifier of FIG. 1 has created composed signatures of the type signatures.
Figure 14:
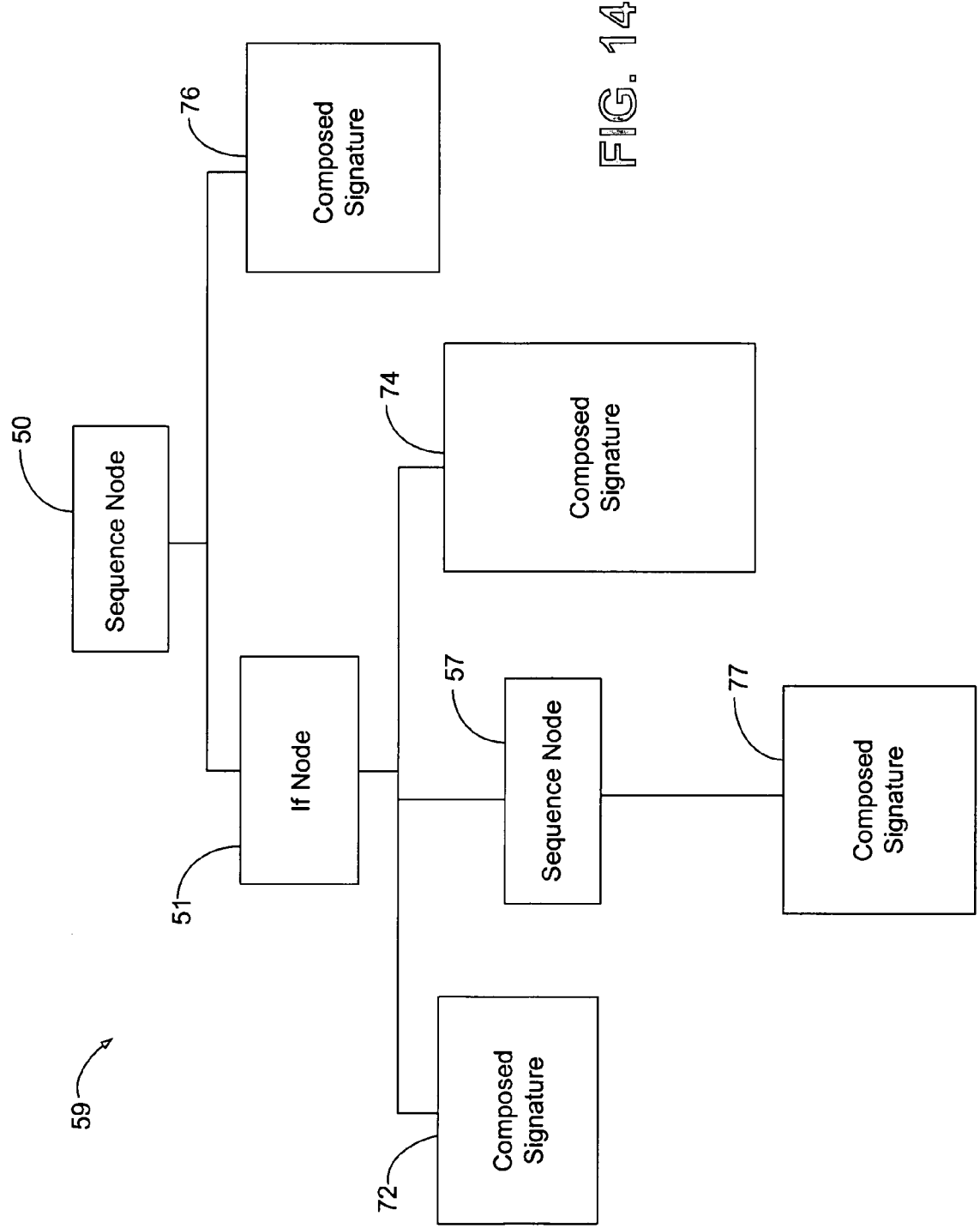
FIG. 14 is a block diagram illustrating composition of composed signatures of a sequence node of FIG. 14.
Figure 15:
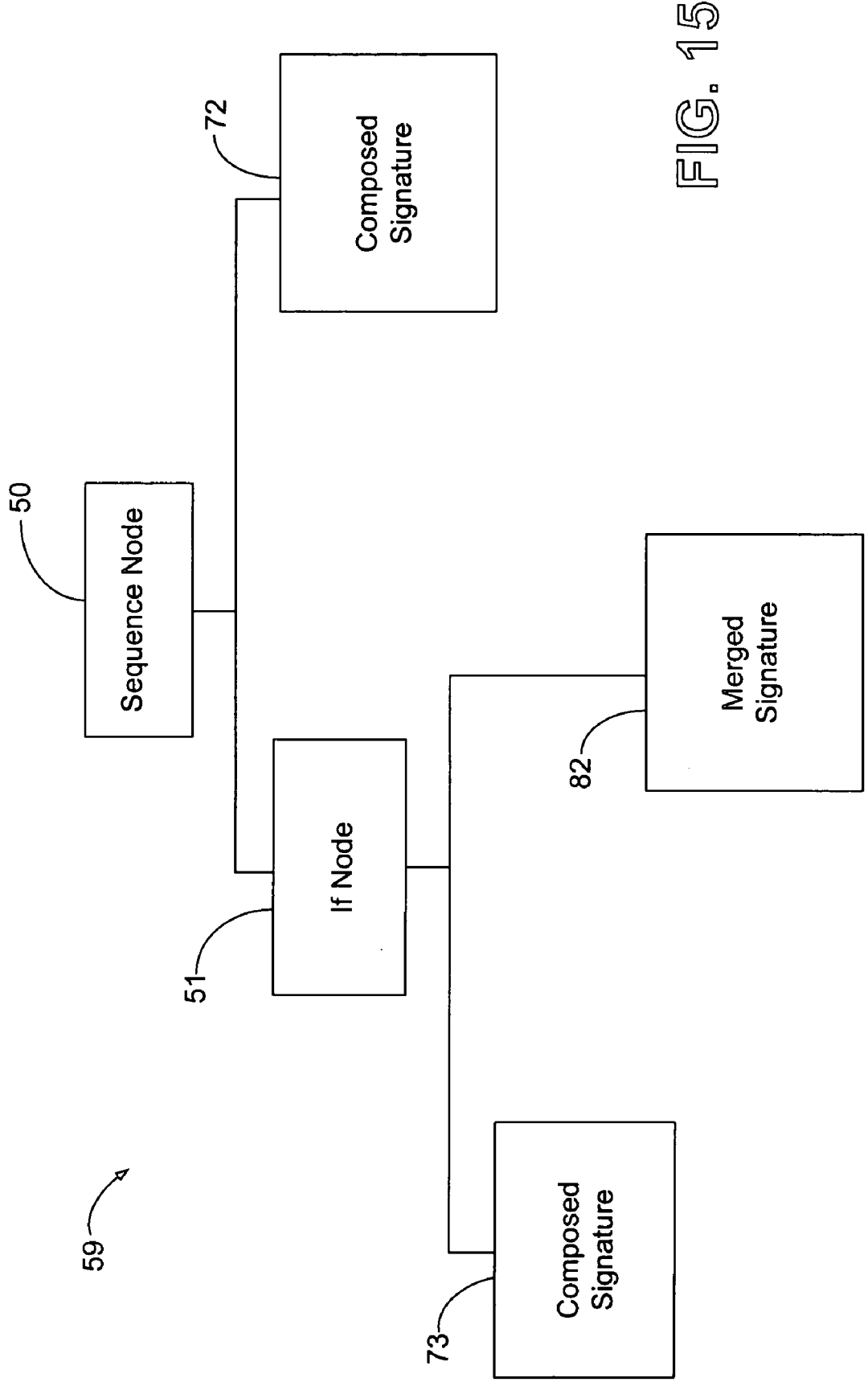
FIG. 15 is a block diagram illustrating merger of alternative code branches of FIG. 14 by the code verifier of FIG. 1.

As illustrated in FIG. 13, the code verifier 20 then creates "composed signatures" representative of the consecutively executed instruction contained preferably within a block, as illustrated by blocks 72-76. The code verifier 20 then preferably translates consecutively executed composed signature blocks, e.g., blocks 73 and 75, into a single composed signature, e.g., block 83, as illustrated in FIG. 14. The code verifier 20 then merges alternative code execution paths, illustrated by the composed signature blocks 77 and 74 into a merged signature 82, as illustrated in FIG. 15, which results in if-node 51 comprising two child nodes, composed signature node 73 and merged signature node 82 as illustrated in FIG. 15.

Figure 16:
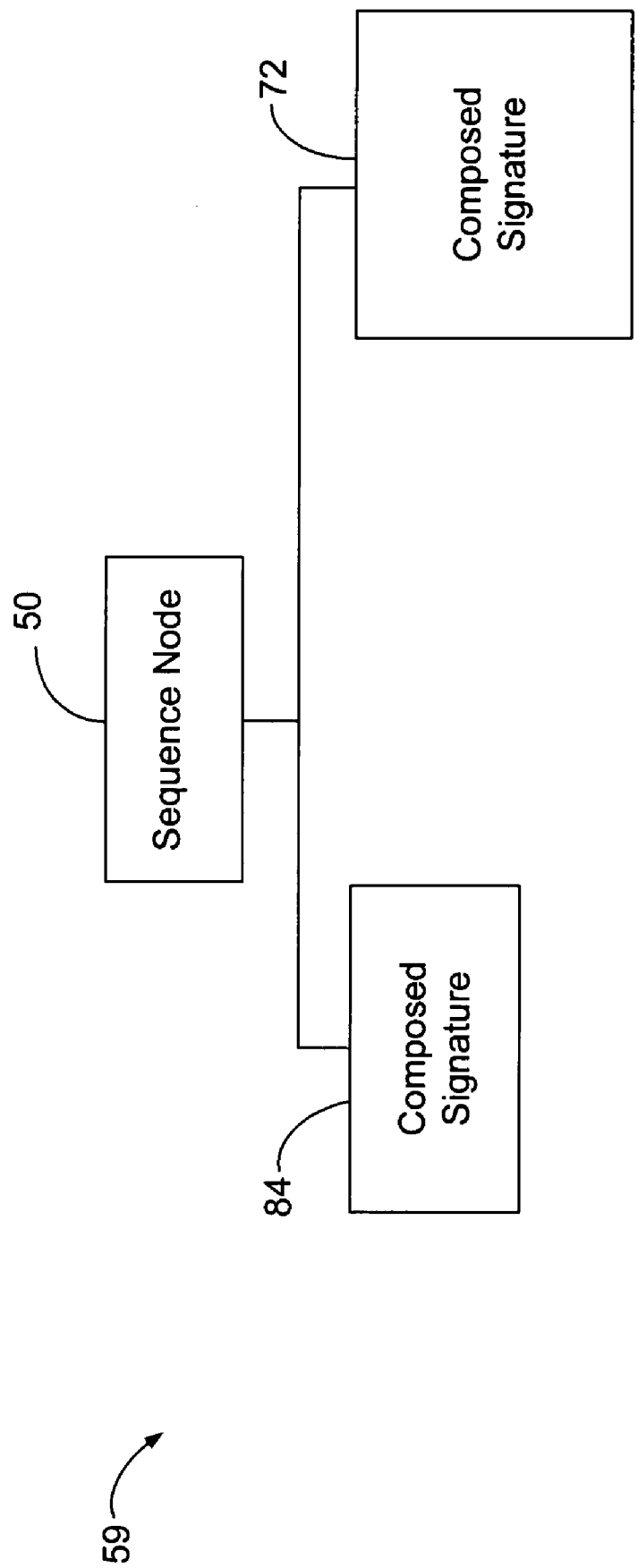
FIG. 16 is a block diagram illustrating composition of a composed signature and a merged signature to obtain a composed signature for the if-node of FIG. 15.
Figure 17:
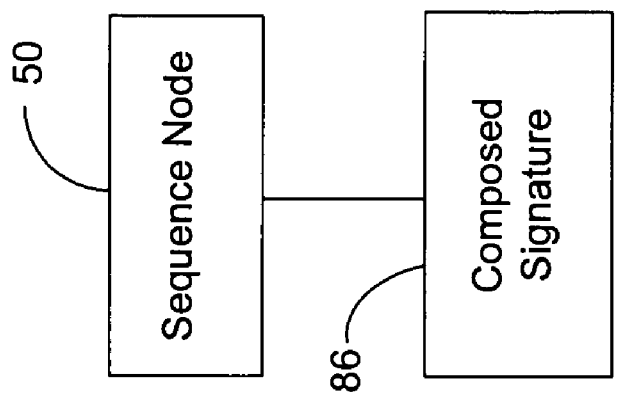
FIG. 17 is a block diagram illustrating the composition of composed signature of FIG. 16 to obtain a composed signature representing the type signature of the coarse tree of FIG. 4.
Figure 18:
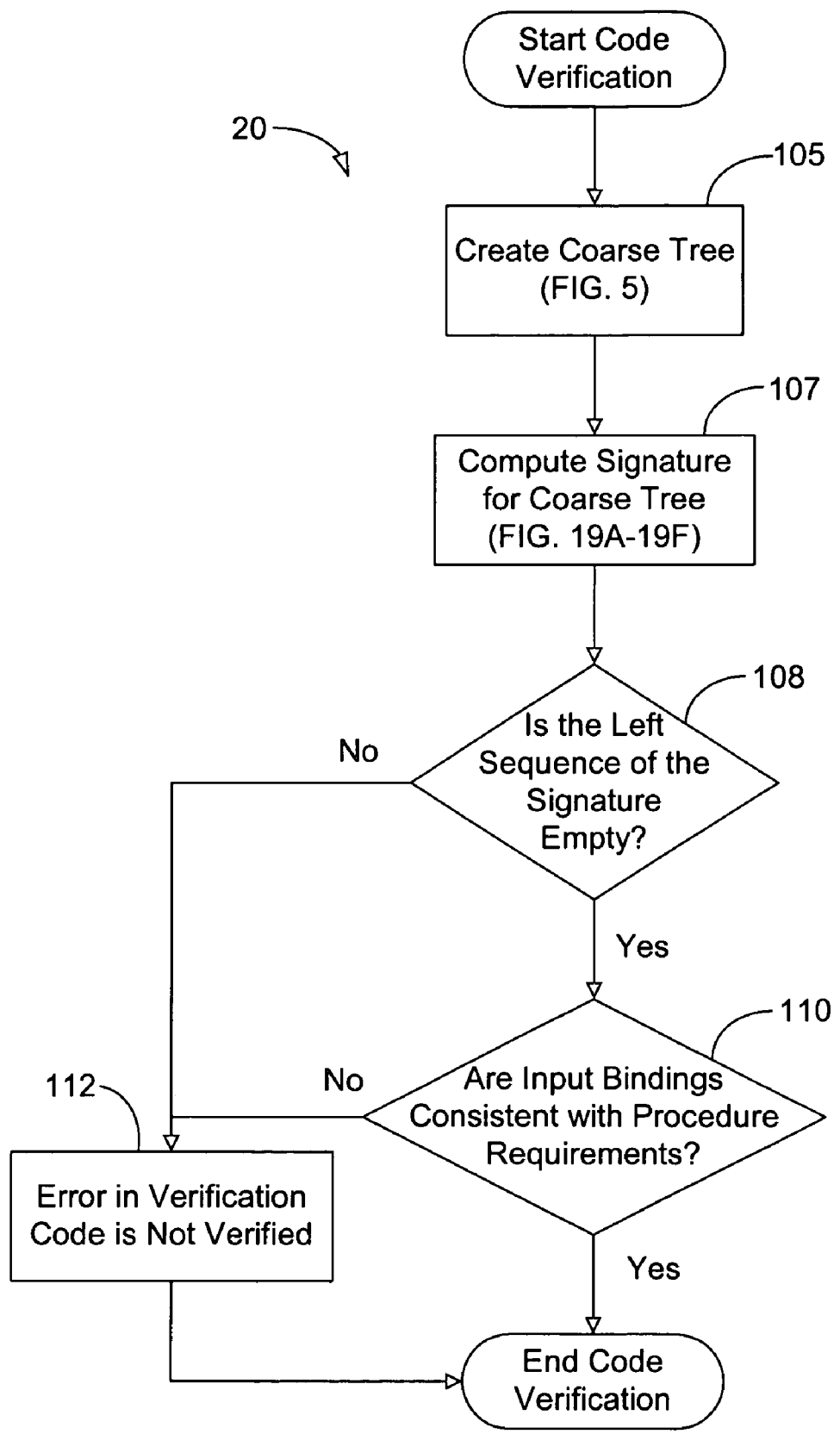
FIG. 18 is a flowchart illustrating an exemplary architecture and functionality of the code verifier of FIG. 1.

The code verifier 20 then determines a signature for the if-node by composing the composed signature 73 and the merged signature 82. This determination results in a composed signature 84, as illustrated in FIG. 16. The code verifier 20 determines a signature for the coarse tree 59 by composing composed signature 84 with composed signature 72, resulting in composed signature 86 illustrated in FIG. 17. The code verifier 20 then performs type checking on the composed signature 86 to verify the code 59. Exemplary methods for determining composed signatures and merged signatures in accordance with the present disclosures are now described with reference to FIG. 18-FIG. 19G.

The type signature for an instruction indicates what types of inputs, if any, the code verifier 20 expects an instruction to consume, when executed, and the type signature indicates what types of outputs, if any, the code verifier 20 expects an instruction to produce when executed. Further, if the instruction refers to a memory location of variable type (e.g., fetches or updates the location's value), then the type signature preferably further indicates the address of that variable and the type that is required. As known in the art, a location is said to have "variable type" if it is permitted for that variable to be used as several unrelated types during its lifetime. For example, the local variables of methods of Java machine code are of "variable type."

As an example of creating a type signature, assume that Instruction D of the code 49, when executed by processing element 27, consumes a value stored in a first memory address of variable type and consumes another numerical value. Also assume that Instruction D produces a numerical value that is to be stored to a second memory address of variable type and produces another numerical value. Further, assume that the code verifier 20 determines that the numerical values consumed by Instruction D are both of the type "double" and that the numerical values produced by Instruction D are both of the type "int." An example of such an instruction may be a division instruction that divides one of the consumed values by the other of the consumed values and that writes the result of division operation to the second memory address while pushing any remainder to the stack 28.

In generating a type signature for the foregoing instruction, the code verifier 20 produces data indicating that, during execution of the instruction, a numerical value of type "double" is consumed from the stack 28 and that, during execution of the instruction, a numerical value of type "double" is consumed from the first memory address. The data also indicates that, during execution of the instruction, a numerical value of type "int" is produced and pushed to the stack 28, and the data indicates that, during execution of the instruction, a numerical value of type "int" is produced and stored in the second memory address.

The type signatures generated by the code verifier 20 may be expressed via a variety of syntactical expressions. As an example, the type signatures produced by the code verifier 20 may be represented using the following syntax:

inBind|inType→outType|outBind where inBind represents the type descriptions of referenced variables, inType represents the type descriptions of values consumed from the stack 28, outBind represents the type descriptions of variables written to the stack 28, and outType represents the type descriptions of produced values pushed to the stack 28.

Note that inBind and outBind may comprise zero or more bindings of the form v:T where v indicates the address of a variable and T indicates the variable's type, and in an input binding, the expression v:T indicates that the type T is expected of the variable v. Whereas, in an output binding, the expression v:T means that the type T gets written to the variable v. Such representation is referred to hereinafter as indicating an "output binding."

OutBind may also be expressed as v::T where v also indicates the address of a variable T, however, the modified syntax of the double colon indicates the "partial output binding." A partial output binding takes the form v::T, where v also indicates the address of a variable and T is a type. However, the modified syntax of the double colon indicates a "partial output binding," as described herein. A partial output binding in a signature means that the associated instruction(s) either write the type T to the variable v, or that the variable is left undisturbed (i.e. that its original value prior to the execution of the instruction(s) is preserved). A partial output binding is used by the code verifier 20 to represent the effect of a code construct that exhibits alternate paths, one or more of which write a type T value to a variable v and one or more of which do not write any value of type T to the variable v. Thus, a signature may comprise, at most, one output binding or partial output binding for the same variable v, i.e., if T1 and T2 are different, arbitrary types and v is a variable, a signature's output bindings may not comprise v:T1 and v:T2, v:T1 and v::T2, or v::T1 and v::T2.

To illustrate the foregoing output binding syntactical formula according to the example of Instruction D described above, assume that the address of the variable consumed by Instruction D is "0001" and that the address of the variable produced by instruction D is "0010." In such an example, the type signature of instruction D may be expressed as:

0001:double|double→int|0010:int.

Note that there are other types of syntaxes that may be utilized in generating the type signatures of the instructions in the code 49, and the syntax employed herein to represent the type signatures of the code 49 is presented for illustrative purposes only.

To illustrate the foregoing syntactical formula with regard to a partial output binding according to an if-node construct 51, as illustrated in FIG. 4, assume that the address consumed by the if-node construct is "0002" and that the address of the variable produced by the if-node construct is "0020." In such an example, the type signature of the if-node construct 51 may be expressed as:

0002:double|double→int|0020::int.

In such an example, the syntactical indication "::" represents that the code either writes a variable of type "int" to the address "0020," or the contents of the address "0020" are left undisturbed. Therefore, with reference to FIG. 4, if the else-node 54 writes a value to the address "0020," but the then-portion of the code, represented by sequence block 57 does not write a value to the address "0020," then this is represented by "::" of the syntactical formula.

Note that in order to accurately reflect a code construct, a signature does not include more than one output binding for the same variable. For example, a block of code cannot write a value of type "double" to an address in memory, which is reserved to store a value of type "int." Further note that it is possible to eliminate partial output bindings v::T from a signature, if an input binding corresponding to the same variable exists. For example, the following is a valid signature:

x:S|I1, I2→O1|x::T.

This can be simplified to the following signature:

x:S|I1, I2→O1|x:T1, where T1 is the greatest common supertype of S and T. The input binding x:S implies that the variable v must be assigned type S prior to executing the associated code block. The partial output binding x::T suggests that one or more code paths in the code block write type T to variable x, while one or more code paths leave x undisturbed. This implies that x must be assigned type T or type S after the code block. Since T1 is compatible with T as well as S, the partial output binding x::T1 can be replaced by the output binding x:T1. Hence it can assume that a signature does not contain an input binding x:S as well as a partial output binding x::T.

In another example, assume that an instruction pops no variables from the stack and consumes two numerical values of type "int." Also assume that the instruction only produces a numerical variable of type "double" that is to be stored at address "1000." In such an example, the type signature of the instruction could be expressed as:

|int, int→|1000:double.

Note that the empty space in inBind (i.e., in front of "|int, int") indicates that there are no consumed variables, and the presence of empty space in outType (i.e., between "→" and "|1000:double") indicates that there are no products that are to be pushed to the stack 28. Furthermore, the comma after the first "int" indicates that there is another value, in addition to the first "int," consumed by the instruction. More specifically, the second "int" (i.e., the "int" that follows the comma) indicates that the other value consumed from the stack 28 is also of the type "int."

Also note that the position of an input value's type description within inType indicates the position of that value on the stack 28 before execution of the instruction, and the position of an output value's type description within outType indicates the position of that value on the stack 28 after execution of the instruction, regardless of any order of pulling and pushing values during actual execution of the instruction. In this regard, the rightmost type description in inType corresponds to the topmost value on the input stack (i.e., the stack 28 prior to execution of the instruction), with each step left in inType corresponding to the next deeper value on the input stack. In addition, the rightmost type description in outType corresponds to the topmost value on the output stack (i.e., the stack 28 after execution of the instruction), with each step left in outType corresponding to the next deeper element on the output stack. Note that additional values underneath those described by inType in the input stack and underneath those described by outType in the output stack are unchanged by the instruction.

To illustrate the foregoing, assume that an instruction has the following type signature:

|String, int→double, float|.

Such an instruction expects a value of type "int" on top of the input stack and a value of type "String" immediately underneath the foregoing "int" value. Both of these values are consumed by the instruction and are replaced by two other values, one of type "float" on top of the output stack and another of type "double" immediately underneath the foregoing "float" value.

Once the code verifier 20 has defined the type signatures for the instructions of the code 49, the code verifier 20 is designed to compose the type signatures for each individual block 52-56 into a single type signature that represents a final type signature for the individual block. For example, the code verifier 20 composes the type signatures of block 72 (FIG. 5) into a single composed type signature, referred to as Composed Signature 72 in FIG. 6. The code verifier 20 also composes the type signatures of blocks 53-56 into single type signatures, respectively referred to as Composed Signatures 73-76 in FIG. 6.

As an example, assume that Instructions A-C of FIG. 4 are respectively translated into Type Signatures A-C. In this example, Instructions A and B are successive and Instructions B and C are successive. In this regard, during execution, Instruction B will be executed immediately after Instruction A, and Instruction C will be executed immediately after Instruction B. Moreover, Type Signature A is derived from Instruction A, and Type Signature B is derived from Instruction B. Further, Instructions A and B are successive. Thus, Type Signatures A and B are successive and, therefore, may be composed.

Note that a merger operation operates upon alternate code branches and is described in more detail hereafter. Note, here, however, that Instructions A and C are not successive, and it would, therefore, be improper to compose Type Signature A directly with Type Signature C, which is derived from Instruction C.

In composing block 62, assume that the code verifier 20 composes Type Signature A with Type Signature B to form a resulting composed signature. This resulting composed signature has been derived from Type Signatures A and B and, therefore, from Instructions A and B. Further, since Instructions B and C are successive, the resulting composed signature is successive with and, therefore, may be composed with Type Signature C. Once all of the signatures of block 62 have been composed into a single composed signature, the composition of block 62 is complete.

By performing the aforedescribed techniques for each signature block 62-66, the code verifier 20 translates the blocks 62-66 into single composed signatures 72-76, respectively. The code verifier 20 then composes signatures 73 and 75 into a single composed signature utilizing techniques similar to those previously described for blocks 62-66.

When composing two type signatures, the code verifier 20 is designed to determine whether the output type descriptions of the earlier type signature are acceptable to the input type constraints of the later type signature. Note that a type signature is earlier than another type signature if it is the signature of an instruction or of instructions that are earlier in the program flow than the instruction or instructions of the other type signature. Furthermore, the output type descriptions of an earlier type signature are acceptable to the input type constraints of the later type signature if no type errors can be detected by comparing the input type constraints to the output type descriptions.

In this regard, in composing two type signatures, the code verifier 20 may compare a type description in outType of the earlier type signature to a corresponding type description in inType of the later signature. A type description in outType of the earlier signature "corresponds" to a type description in inType of the later signature if the two type descriptions refer to the same stack value. For example, assume that by analyzing a first instruction, it can be determined that the first instruction pulls a value of type "type1" from the stack 28. Also, assume that it can be determined that the instruction pushes a value of type "type2" to the stack 28 and then pushes a value of type "type3" to the stack 28. Further assume that, by analyzing the next successive instruction, it can be determined that the next successive instruction pulls a value of "type4" from the stack 28 and then pulls a value of "type5" from the stack 28. It can also be determined that this instruction pushes a value of type "type6" to the stack 28. Note that "type1" to "type6" each represent a type or class, such as "int," "String," etc.

The two instructions may be translated into two type signatures represented as:

|type1→type2, type3|
|type5, type4→type6|.

In this example, "type2" and "type5" refer to the same stack value (i.e., the first value pushed to the stack by the earlier instruction) and, therefore, "correspond" to one another. Further, "type3" and "type4" refer to the same stack value (i.e., the second value pushed to the stack 28 by the earlier instruction) and, therefore, "correspond" to one another.

Note that by following the composition techniques that will be described in further detail hereafter, corresponding type descriptions in inType of the later type signature and outType of the earlier type signature preferably occupy the same position in inType and outType from the right. Another way of expressing this is if inType is represented as a series of type descriptions $U_1$ through $U_n$ from left to right and if outType is represented as a series of type descriptions $T_1$ through $T_m$ from left to right (in which n and m are integer values of equal or unequal values), then $U_i$ corresponds to $T_j$ if n−i=m−j. Moreover, in the foregoing example, "type3" occupies the rightmost position in outType of the earlier signature, and "type4" occupies the rightmost position in inType of the later signature. Thus, "type3" and "type4" occupy the same position from the right in outType of the earlier signature and inType of the later signature respectively. As a result, it can be determined by analyzing the foregoing signatures that "type3" corresponds to "type4."

Similarly, both "type2" and "type5" occupy the second rightmost position in outType of the earlier signature and in inType of the later signature, respectively. Thus, it can be determined by analyzing the foregoing signatures that "type2" corresponds to "type5." Moreover, the code verifier 20 determines whether a type description in outType of a first signature corresponds to a type description in inType of a next successive signature by merely analyzing the positions of the type descriptions in inType and outType, as described above.

Note that if the earlier signature fails to include a type description in the same position of outType as a type description in inType of the later signature, then there is no corresponding type description in the outType of the earlier signature for the foregoing inType type description. Such an inType type description is not checked for type errors during a composition of the two signatures. Further, if the later signature fails to include a type description in the same position of inType as a type description in outType of the earlier signature, then there is no corresponding type description in the inType of the later signature for the foregoing outType type description. Such an outType type description is not checked for type errors during a composition of the two signatures.

As previously set forth, when composing two successive signatures, the code verifier 20 compares a type description in outType of the earlier signature to a corresponding type description in inType of the later signature. More specifically, the code verifier 20 determines whether the type description in outType of the earlier signature is acceptable to the corresponding type description in inType of the later signature such that no type errors are detectable. In this regard, a first type description is acceptable to a second type description if an instruction can produce a value of a type described by the first type description and if another instruction designed to utilize a value of a type described by the second type description can utilize the produced value without generating a type error.

For example, it is well known in Java that "Integer" and "String" are both subtypes of the class "Object." As a result, an instruction that is designed to consume an input of type "Object" may, without causing a type error, consume the product of an instruction that produces a "String" or may consume the product of an instruction that produces an "Integer." Therefore, both an "Integer" type description and a "String" type description are acceptable to an "Object" type description.

It is also well known in Java that "int" and "double" are of different types. Moreover, an instruction that is designed to consume an input of type "int" may not consume, without causing a type error, an input of type "double." Therefore, an "int" type description is not acceptable to a "double" type description.

When two signatures are being composed and when a type description in outType of the earlier signature corresponds to a type description in inType of the later signature, the type description in outType of the earlier signature is type checked against the corresponding type description in inType of the later signature, and the two corresponding type descriptions are then removed (i.e., do not appear in the composed signature). Further, when a type description in outType of the earlier signature does not correspond to a type description in inType of the later signature, the type description in outType of the earlier signature appears in outType of the composed signature, and when a type description in inType of the later signature does not correspond to a type description in outType of the earlier signature, the type description in inType of the later signature appears in inType of the composed signature.

In addition, when composing two signatures, the code verifier 20 simply inserts into the composed signature, the type descriptions of inType for the earlier signature and the type descriptions of outType for the later signature. More specifically, the code verifier 20 inserts each type description of inType from the earlier signature into the inType of the composed signature, and the code verifier 20 inserts each type description of outType from the later signature into the outType of the composed signature.

Accordingly, in the example described above, the two signatures could be successfully composed if "type2" is acceptable to "type5" and if "type3" is acceptable to "type4." If the foregoing is true, then the composed signature should be:

|type1→type6|.

In another example, assume that four successive type signatures, from earliest to latest, are expressed as:

|type1→type2, type3|     (Signature A.1)

|type4→type5|     (Signature B.1)

|type6→|     (Signature C.1)

|type7→|     (Signature D.1)

in which "type1" to "type7" each represents a type description, such as "int," "String," etc. In this example, Signature A.1 indicates that a value of type "type1" is replaced by values of types "type2" and "type3" in that order. Signature B.1 indicates that a value of type "type4" is replaced by a value of type "type5." Signature C.1 indicates that a value of type "type6" is consumed, with no new value generated. Similarly, Signature D.1 indicates that a value of type "type7" is consumed.

To compose Signatures A.1 and B.1, the code verifier 20 first determines that "type3" corresponds to "type4" by virtue of their respective positions in outType of the earlier signature and inType of the later signature. Thus, the code verifier 20 checks to determine whether "type3" is acceptable to "type4." If "type3" is not acceptable to "type4," then the code verifier 20 detects an error. Otherwise, the code verifier 20 fails to detect an error, and the composition may occur. The composed signature may be represented as:

|type1→type2, type5|.

This composed signature may then be composed with Signature C.1. To compose these two signatures, the code verifier 20 first determines that "type5" corresponds to "type6" by virtue of their respective positions in outType of the earlier signature and inType of the later signature. Thus, the code verifier 20 checks to determine whether "type5" is acceptable to "type6." If "type5" is not acceptable to "type6," then the code verifier 20 detects an error. Otherwise, the composition may occur, and the composed signature may be represented as:

|type1→type2→.

This composed signature may then be composed with Signature D.1. To compose these two signatures, the code verifier 20 first determines that "type2" corresponds to "type7" by virtue of their respective positions in outType of the earlier signature and inType of the later signature. Thus, the code verifier 20 checks to determine whether "type2" is acceptable to "type7." If "type2" is not acceptable to "type7," then the code verifier 20 detects an error. Otherwise, the code verifier 20 fails to detect an error, and the composition may occur. The composed signature should be represented as:

|type1→|.

Note that it is not necessary for the signatures to be composed in the above-described order provided that only successive signatures are composed. For example, as described above, the code verifier 20 may first compose Signature A.1 with Signature B.1 to produce a first composed signature represented as:

|type1→type2, type5|.

After forming the first composed signature, the code verifier 20 may form a second composed signature by composing Signature C.1 with Signature D.1. The second composed signature may be expressed as:

|type6, type7→|.

The first and second composed signatures may then be composed together via the code verifier 20. To compose these two signatures, the code verifier 20 determines that "type5" corresponds to "type7" by virtue of their respective positions in outType of the earlier signature and inType of the later signature. The code verifier 20 also determines that "type2" corresponds to "type6" by virtue of their respective positions in outType of the earlier signature and inType of the later signature. Thus, the code verifier 20 determines whether "type5" is acceptable to "type7" and whether "type2" is acceptable to "type6." If "type5" is not acceptable to "type7" or if "type2" is not acceptable to "type6," then the code verifier 20 detects an error. However, if "type5" is acceptable to "type7" and if "type2" is acceptable to "type6," then no error is detected, and the composition is allowed. The composition of the first and second composed signatures should yield:

|type1→|.

Thus, the same result is effectively reached in both of the foregoing examples even though the signatures were composed in a different order.

In composing two signatures, the code verifier 20 also checks for consistency between type descriptions of any local variables included in the type signatures. For example, assume that a signature indicates that a value of a particular type is stored to a local variable. If another signature indicates that this same value is later retrieved from the local variable, then the particular type indicated by the former signature should be acceptable to the type description of the value, as indicated by the other signature.

To achieve the foregoing in a preferred embodiment, the code verifier 20 analyzes the inBind and outBind of type signatures during composition. In this regard, the code verifier 20, when composing two signatures, compares the type descriptions in the inBind of the later signature to the type descriptions in the outBind of the earlier signature. If a type description for a variable is present in the inBind of the later signature and if a type description for the same variable is present in the outBind of the earlier signature, then the two type descriptions should be consistent. In this regard, if the foregoing outBind type description is unacceptable to the foregoing inBind type description, then the code verifier 20 detects an error. Otherwise, the composition is allowed to continue without detecting an error.

Moreover, when the inBind of the later signature and the outBind of the earlier signature have acceptable type descriptions for the same variable, the code verifier 20 fails to include, in the resulting composed signature, the type description from the inBind of the later signature. However, the code verifier 20 inserts, in the outBind of the resulting composed signature, the type description from the outBind of the earlier signature, unless the later signature includes a type description for the same variable in outBind as well. If the later signature includes a type description for the same variable in outBind, then the code verifier 20 inserts the type description from the outBind of the later signature instead of the type description from the outBind of the earlier signature. In such a case, it is not necessary for the code verifier 20 to check for consistency between the variable's type description in outBind of the earlier signature and the variable's type description in outBind of the later signature.

In addition, if type descriptions for the same variable are present in both the outBind of the earlier signature and the outBind of the later signature and if a type description for the same variable is not present in the inBind for the later signature, then the code verifier 20 simply includes the type description of the later signature in the outBind of the resulting composed signature. The type description of the earlier signature is not included in the resulting composed signature.

Furthermore, if the inBind of both the earlier and later signatures have type descriptions for the same variable and if the outBind of the earlier signature does not have a type description for this variable, then the code verifier 20 simply includes the type description of the earlier or the later signature in the inBind of the resulting composed signature, whichever is more specific. In such a case, the code verifier 20 checks for consistency between the two type descriptions of the earlier and later signatures. In this regard, if the type description of the earlier signature is acceptable to the type description of the later signature, the type description of the earlier signature is added to the composed signature. If the type description of the later signature is acceptable to the type description of the earlier signature, the later signature is added to the composed signature. If neither of these two cases applies, then the code verifier 20 detects an error. Otherwise, the composition is allowed to continue without detecting an error.

If one of the foregoing conditions does not occur for a particular type description in the inBind of either the earlier or later signature, then the code verifier 20 includes, in the inBind of the resulting composed instruction, the particular type description. Further, if one of the foregoing conditions does not occur for a particular type description in the outBind of either the earlier or later signature, then the code verifier 20 includes, in the outBind of the resulting composed instruction, the particular type description.

While composing two signatures, if neither of the signatures that are being composed include partial output bindings, as described herein, then the method as described above applies. However, if any one of the signatures includes a partial output binding the following rules apply.

To illustrate composing signatures that contain partial output bindings, assume the following:

R=S1 compose S2, where signatures S1, S2, or both contain a partial output binding, and R is the signature resulting from the composition of S1 and S2. Further, assume that "x" is the variable that is subject to the partial output binding.

If the signatures for S1 and S2 take the following form:

S1=| |x::O1; and
S2=| |x::O2, where S1 and S2 do not contain input bindings and contain partial output bindings. R comprises a partial output binding, x::(O1^O2), wherein "O1^O2" is defined as the greatest common supertype of O1 and O2.

If the signatures for S1 and S2 take the following form:

S1=| |x:O1; and
S2=| |x::O2, where S1 comprises an output binding x:O1 and S2 comprises a partial output binding X::O2, R comprises an output binding x:(O1^O2). In addition, although not shown specifically, if S1 contains an input binding, for example, x:I1, then the resulting signature contains the same input binding x:I1.

If the signatures for S1 and S2 take the following form:
S1=∥; and
S2=∥X::O2, composing S1 and S2 provides signature R, which has an output binding X::O2.

If the signatures for S1 and S2 take the following form:
S1=∥X::O1; and
S2=X:I2∥, where S1 has a partial output binding X::O1 and S2 has an input binding X:I2. I2 must accept O1, and the resulting signature R has an input binding X:I2 and output binding X:I2.

If the signatures for S1 and S2 take the following form:
S1=∥X::O1; and
S2=∥, where S1 has an output binding X::O1 and S2 does not have any input binding X:I2, then the resulting signature R has an output binding X:O1.

To illustrate the foregoing techniques for handling type descriptions in the inBind and outBind of signatures being composed, assume that a block of consecutive instructions consumes and produces values according to the following description.

A first instruction consumes two values from the stack 28 and produces a value for a first variable that is stored in a first memory location (e.g., memory location "0001"). The second instruction then consumes the value of the first variable that is stored in memory location "0001" and produces a value that is pushed to the stack 28. This instruction also produces a value for a second variable that is stored in a second memory location (e.g., memory location "0010"). A third instruction then consumes a value from the stack 28 and produces another value for the second variable. Then, a fourth instruction consumes the value of the first variable that is stored in memory location "0001" and produces two values that are pushed to the stack 28. A final instruction then consumes the value of the second variable that is stored in memory location "0010" and further consumes a value from the stack 28. This final instruction also produces a value for the first variable.

The type signatures of the foregoing set of instructions may be expressed as:

| | |
|---|---|
| ∥type1, type2→∣0001:type3 | (Signature A.2) |
| 0001:type4∣→type5∣0010:type6 | (Signature B.2) |
| ∥type7→∣0010:type8 | (Signature C.2) |
| 0001:type9∣→type10, type11∣ | (Signature D.2) |
| 0010:type12∣type13→∣0001:type14 | (Signature E.2), | where "type1" to "type14" each represents a type description, such as "int," "String," etc. Although the foregoing type signatures can be composed in different orders, as previously described, assume that the code verifier 20 composes these signatures from the latest to the earliest (i.e., from Signature E.2 to Signature A.2). Thus, the code verifier 20 first composes Signature E.2 with signature D.2.

In composing these two signatures, the code verifier 20 determines that "type11" corresponds with "type13." Thus, the code verifier 20 checks to determine whether "type11" is consistent with or, in other words, acceptable to "type13." If these type descriptions are inconsistent, then the code verifier 20 detects an error. Otherwise, the composition is allowed to proceed.

In performing the composition, the code verifier 20 includes, in the inBind of the composed signature, the type description from the inBind of Signature D.2 and the type description from the inBind of Signature E.2. The code verifier 20 also includes, in the outBind of the composed signature, the type description from the outBind of Signature E.2. There is no need for the code verifier 20 to perform any consistency checks between any of these type descriptions. The composed signature may be expressed as:

0001:type9, 0010:type12∣→type10∣0001:type14.

The code verifier 20 then composes this composed signature with Signature C.2. The inBind of the foregoing composed signature includes a type description for the second variable, and the outBind of Signature C.2 (i.e., the earlier signature in this composition) includes a type description for the same variable. Thus, in performing the composition, the code verifier 20 determines whether these type descriptions are consistent. More specifically, the code verifier 20 determines whether "type8" is acceptable to "type12." If "type8" is unacceptable to "type12," then the code verifier 20 detects an error. Otherwise, the code verifier 20 allows the composition to proceed. Note that if the composition proceeds, there is no need to include the foregoing inBind type description in the newly composed signature. Such a newly composed signature may be expressed as:

0001:type9∣type7→type10∣0001:type14, 0010:type8.

The code verifier 20 then composes this composed signature with Signature B.2. In this composition, "type5" corresponds with "type7," and the code verifier 20, therefore, determines whether "type5" is acceptable to "type7." If "type5" is unacceptable to "type7," then the code verifier 20 detects an error. Otherwise, the code verifier 20 allows the composition to continue.

In performing the foregoing composition, the code verifier 20 determines that the inBind of the earlier signature (i.e., Signature B.2) includes a type description of a variable (i.e., the variable associated with address "0001"), and the code verifier 20 determines that the inBind of the later signature (i.e., the foregoing composed signature) includes a type description for the same variable. Therefore, the code verifier 20 checks these type descriptions for consistency. More specifically, the code verifier 20 determines whether "type4" is acceptable to "type9" or "type9" is acceptable to "type4". If neither is true, then the code verifier 20 detects an error. Otherwise, the code verifier 20 allows the composition to continue and includes, in the inBind of the resulting composed signature, the type description for the more specific of the two types (i.e., "0001:type4"). For example, assume that "type4" is acceptable to "type9". Then the resulting composed signature contains the type description "0001:type4."

In addition, the code verifier 20 should also determine that the outBind of the earlier signature (i.e., Signature B.2) includes a type description of a variable (i.e., the variable associated with address "0010"), and the code verifier 20 should determine that the outBind of the later signature (i.e., the foregoing composed signature) includes a type description for the same variable. The code verifier 20 allows the composition to continue and includes, in the outBind of the resulting composed signature, the type description (i.e., "0010:type8") from the later signature and discards the type description (i.e., "0001:type6") from the earlier signature. The newly composed signature may be expressed as:

O001:type4|→type10|0001:type14, 0010:type8.

The code verifier 20 then composes this composed signature with Signature A.2. In this composition, the outBind of the earlier signature (i.e., Signature A.2) includes a type description for the variable associated with address "0001," and the inBind of the later signature (i.e., the foregoing composed signature) includes a type description for this same variable. Therefore, the code verifier 20 checks these type descriptions for consistency. More specifically, the code verifier 20 determines whether "type3" is consistent with or, in other words, acceptable to "type4." If "type3" is unacceptable to "type4," then the code verifier 20 detects an error. Otherwise, the code verifier 20 allows the composition to continue. Note that the code verifier 20 does not check for consistency between "type3" and "type8." The newly composed signature, which is the resulting signature for the entire signature block, can be expressed as:

|type1, type2→type10|0001:type14, 0010:type8.

At this point the composition for the signature block is complete.

It is well known that some instructions may consume or produce a value, wherein the type of the value is indicated by a type variable. Such a value cannot be assigned a particular type description by simply analyzing the instruction that consumes or produces the value. However, it is still possible to check for type errors associated with the value by comparing the type variable to type descriptions of other signatures. An example of how such type checking may be performed will be described below.

In the preferred embodiment, the name of a type variable is used as the type variable's type description in its type signature. Thus, assume that an instruction consumes an input that has a type indicated by a type variable named "example," which is stored in a particular memory location, referred to as "0001." Also assume that the instruction pushes the foregoing value onto the stack 28. The type signature can be represented as:

0001:example|→example|.

When the type variable is checked for consistency against another type description during a composition, the name of the type variable is replaced with an arbitrary name, and this arbitrary name is correlated with the other type description. For example, assume that the next successive instruction, when executed, consumes a value from the stack 28 and that, by analyzing the next successive instruction, it can be determined that this value pulled from the stack 28 should be of a particular type, referred to as "type1." Note that "type1" may be any type or class, such as, for example, "String," "int," "double," etc. The type signature of the next successive instruction may be expressed as:

|type1→|.

In this example, the type variable "example" corresponds to the type description "type1" by virtue of their respective positions in outType of the earlier signature and in inType of the later signature. Thus, for there to be no type errors, the type variable "example" should be acceptable to "type1."

In composing the two signatures, the code verifier 20 may be configured to rename the type variable to an arbitrary name, such as "example1." Moreover, the code verifier 20 may express the composition of the two signatures as:

location1: example1|  ⟶  example1: type1.

Thus, the code verifier 20 allows the composition to occur without detecting an error but indicates that there is a constraint on the type variable. More specifically, the term "example1:type1" indicates that the type variable of the signature is bound to "type1."

To illustrate the foregoing, assume that a block of consecutive instructions, when executed, consumes and produces values according to the following description.

A first instruction consumes a value from the stack 28 and produces a value that is stored in a first memory location (e.g., memory location "0001"). A second instruction then consumes a value having a type indicated by the type variable "example" from memory location "0001" and produces a value that is pushed to the stack 28. A third instruction then consumes a value from the stack 28 and produces a value that is stored to the memory location "0001." A fourth instruction consumes the a value having a type indicated by the type variable "example" from memory location "0001" and produces a value that is pushed to the stack 28. A final instruction then consumes a value from the stack 28 and produces a value that is stored in a second memory location (e.g., "0010").

The type signatures of the foregoing set of instructions may be expressed as:

|type1→|0001:type2   (Signature A.3)

0001 example|→example|   (Signature B.3)

|type3→|0001:type4   (Signature C.3)

0001:example|→example|   (Signature D.3)

|type5→|0010:type6   (Signature E.3), where "type1" to "type6" each represents a type description, such as "int," "String," etc. Although the foregoing type signatures can be composed in different orders, as previously described, assume that the code verifier 20 composes these signatures from the latest to the earliest. Thus, code verifier 20 first composes Signature E.3 with Signature D.3.

In composing the two foregoing signatures, the code verifier 20 renames the type variable to an arbitrary name, such as "examples," and indicates that the type variable "example1" is bound to "type5." The resulting composed signature may be expressed as:

0001: example1|  ⟶  |0010: type6   example1: type5.

The code verifier 20 then composes the foregoing signature with Signature C.3. In composing these signatures, the code verifier 20 determines whether "type4" is acceptable to "type5." If "type4" is unacceptable to "type5," then the code verifier 20 detects an error. However, if "type4" is acceptable to "type5," then the code verifier 20 fails to detect an error and allows the composition to continue. The resulting signature may be expressed as:

|type3→|0010:type6, 0001:type4.

The code verifier 20 then composes the foregoing signature with Signature B.3. In composing the two signatures, the code verifier 20 renames the type variable "example" of Signature B.3 to an arbitrary name, such as "example2," and indicates that "example2" is bound to "type3." The resulting composed signature may be expressed as:

0001: example 2 |  $\longrightarrow$  | 0010: type6, 0001: type4  example2: type3.

The code verifier 20 then composes the foregoing signature with Signature A.3. In composing these signatures, the code verifier 20 determines whether "type2" is acceptable to "type3." If "type2" is unacceptable to "type3," then the code verifier 20 detects an error. However, if "type2" is acceptable to "type3," then the code verifier 20 fails to detect an error and allows the composition to continue. Note that the code verifier 20 does not perform a type check between "type2" and "type4." The resulting signature may be expressed as:

|type1→|0010:type6, 0001:type4.

At this point the composition for the signature block is complete.

To illustrate the aforedescribed techniques with reference to a partial output binding, assume that two instructions consumes and produces values according to the following descriptions:

|→typeFloat1|0020::typeInt    (Signature A.4)

|typeFloat2→|0020::typeString    (Signature B.4)

In composing these two signatures, A.4 and B.4, the code verifier 20 determines that typeFloat1 and typeFloat2 correspond. If these type descriptions are inconsistent, then the code verifier 20 detects an error. Otherwise composition proceeds.

Then, in accordance with the rules set forth herein, A.4 comprises a partial output binding, wherein a value of "integer" type may, or may not be written to the address 0020. Further instruction B.4 comprises a partial output binding, wherein a value of type "string" may or may not be written to the same address of 0020. Thus in accordance with the rules the resulting composed signature may be expressed as:

| |0020:(typeInt^typeString),    (Signature C.4)

where (typeInt^type String) is representative of a common supertype of an "integer" and a "string." For example, as noted herein, in Java™ integers and strings belong to the "object" class. Therefore, the resulting signature from signature C.4 may be expressed as:

| |0020::typeObject.

Another example of composing signatures having partial output bindings is as follows:

|type1→type2| 0030::typeBanana    (Signature A.5)

0030:typeFruit|Type3→|    (Signature B.5)

In composing these two signatures, A.5 and B.5, the code verifier 20 determines that type2 and type3 correspond.

Then, in accordance with the rules set forth herein, A.5 comprises a partial output binding, wherein a value of "Banana" type may or may not be written to the address 0030. Further, instruction B.5 comprises on input binding, wherein a value of type "Fruit" is required at the same address 0030.

Thus, the resulting signature is as follows:

0030:typeFruit|type1|0030(typeBanana^typeFruit),    (Signature C.5)

where (typeBanana^typeFruit) is representative of the greatest common supertype of typeBanana and typeApple. Since "Banana" belong to the "Fruit" class, the resulting signature C.5 can be written:

X:typeFruit|type1|X:typeFruit

The above examples are provided to illustrate exemplary composition, and such examples are not intended to be exhaustive.

Note that when the code verifier 20 detects a type error, the code verifier 20 may be configured to invoke the error handler 24. The error handler 24 may be configured to handle detected type errors according to a variety of methodologies. In the preferred embodiment, the error handler 24 transmits a notification message that indicates an error has been detected. This message may be displayed to the user via output device 36. The error handler 24 also takes any necessary steps to ensure that the code 49 being checked is not executed by the system 10.

It should be further noted that it is not necessary for the type signatures to be expressed according to the syntax for the type signatures described herein. Moreover, there are numerous methodologies and syntax's that may be employed to indicate the input type constraints and the output type descriptions for each instruction. Thus, there are numerous methodologies and syntax's that may be employed to define and compose the type signatures.

In addition to composing consecutively executing instructions into single type signatures, the code verifier 20 also preferably creates a signature for alternatively executable code paths, hereinafter referred to as a "merged signature." The merged signature also indicates what types of inputs, if any, the code verifier 20 expects the instructions of the compiled program 12 to consume, when executed, and the merged signature preferably indicates what types of outputs, if any, the code verifier 20 expects the instruction to produce when executed. Note that alternate code branches result from code constructs, such as conditional constructs, for example, if-then-else constructs, and loop constructs.

As an example of the merge operation that yields a merged signature 82 of FIG. 15, assume for illustrative purposes that the composed signatures 77 and 79 of FIG. 14 are the following;

inBind1|inTypes1→outTypes1|outBind1    (Signature A.6)

inBind2|inTypes2→outTypes2|outBind2    (Signature B.6)

Initially, the code verifier 20 reconciles the lengths of the type sequences inTypes1 and inTypes2. If inTypes1 and inTypes2 are of different lengths, then the code verifier extends the shorter of the two type sequences. For illustrative purposes, assume that signature A.6 is the shorter type sequence and delta is the numeric difference between the lengths of inTypes1 and inTypes2. Signature A.6 can be extended where inTypes2 comprises a subsequence, sequence1, having a length delta and a subsequence, sequence2. In other words, the length of sequence1 is equal to the difference in the length of inTypes2 and inTypes1, which is delta. The code verifier 20 then extends signature A.6 to the following:

inBind3→inTypes3→outTypes3|outBind3    (Signature C.6)

where inBind3 is equal to inBind1, outBind3 is equal to outBind1, inTypes3 is the concatenation of sequence1 and inTypes1, and outTypes3 is the concatenation of sequence1 and outTypes1. The procedure guarantees that inTypes3 is of the same length as inTypes2. If outTypes2 and outTypes3 are of different lengths, the code verifier 20 signals an error. Otherwise the code verifier allows the merge to proceed.

The code verifier 20 then merges B.6 and C.6 into a merged signature having the syntax:

inBindM|inTypesM→outTypesM|outBindM. (Signature D.6)

First, the code verifier 20 constructs inTypesM from inTypes2 and inTypes3 by determining the least common subtype of inTypes2 and inTypes3. Note, as discussed herein, the syntactical expressions that define the type signatures produced by the code verifier 20 may adhere to the following formula:

inBind|inType→outType|outBind where inBind represents the type descriptions of consumed variables, inType represents the type descriptions of values consumed from the stack 28, outBind represents the type descriptions of produced variables, and outType represents the type descriptions of produced values pushed to the stack 28.

A least common subtype of inTypes2 and inTypes3 is that type that at least satisfies the conditions of both indicated types. In this regard, the more specific of the two types. For example, as discussed herein, it is well known in Java that "Integer" and "String" are both subtypes of the class "Object." Therefore, if inTypes2 is an "Object" and inTypes3 is an "Integer," then the inTypesM replacement of the inTypes signature is the least common subtype, which in this example is an "Integer."

The code verifier 20 then constructs inBindM, which is the type description of the consumed variables, by unifying inBind2 and inBind3. In this regard, if a variable is consumed by only one of the input bindings, for example inBind1, then the corresponding type is added to inBindM. If, however, the variable is consumed by each input binding, then inBindM contains a binding for the variable corresponding to the least common subtype of inTypes2 and inTypes3. If the types are incompatible, for example inTypes2 is an "Integer" and inTypes3 is a "double," then the merge operation fails.

After the code verifier 20 constructs outBindM, which is the type description of the produced variables, from outBind2 and outBind3. In this regard, if a produced variable has an output binding in both outBind2 and outBind3, then outBindM contains a binding for the greatest common supertype. For example if outBind2 contains v:S and outBind3 contains v:T, then outBindM contains v:T1, where T1 is the greatest common supertype of S and T.

If a variable has an output binding in one signature, e.g., v:S, and a partial output binding in the other, e.g., v::T, the merged signature has a partial output binding for the greatest common supertype, e.g., v::T1, where T1 is the greatest common supertype of S and T.

If a variable has a partial output binding in both signatures, e.g., v::S and v::T, then the result contains a partial output binding for the greatest common supertype, e.g., v::T1, where T1 is the gcs of S and T.

If a variable has an output binding or a partial output binding in one signature, e.g., v::S or v:S, and no binding (partial or otherwise) in the other signature, the result has a partial output binding for the same variable and type, e.g., v::S.

Moreover, in some scenarios partial output bindings may be eliminated from resulting signature, as described herein.

As discussed herein, the composed signatures and merged signatures indicate what types of input, if any, the code verifier 20 expects the instruction to consume, when executed, and the type of signature indicates what types of outputs, if any, the code verifier 20 expects the instruction to produce when executed. The signatures described thus far indicate type signatures representing executed code instructions which encompass simple control transfers and are referred to as 'basic signatures. However, the code 12 may further contain code constructs that involve the transfer of control within the code 12, such as break, or continue constructs, that are preferably represented by a type signature that allows for these more complex code constructs.

In this regard, extended signatures will now be described as well as the computation of type signatures for such constructs. In order to represent control transfers that may be present in the program 12, in addition to the basic signature as described herein, zero or more jump signatures are preferably added to the basic signature. Jump signatures represent the effect on the program flow of code constructs, such as break constructs or continue constructs. The jump signatures within an extended signature represent the continue and break transfers encompassed by the code block(s) corresponding to the extended signature. A jump signature may adhere to the following formula:

(type label1 A), where the term "type" indicates the type of code construct (break or continue), label1 represents the node for the associate loop node, and A is a basic signature.

A jump signature for a break code construct may adhere to the following formula:

(break label1 A), where the term "break" indicates the break type of control transfer, label1 indicates the node for the loop out of which control is transferred, and A is a basic signature, which is determined as described herein with respect to composition and merger and which is preferably dictated by the type of constructs within the code.

A jump signature representing a continue construct may adhere to the following formula:

(continue label2 B), where the term "continue" indicates the continue type of control transfer, label2 represents the loop node to which control is transferred, and B is the basic signature for the code, which is determined as described herein with respect to composition and merger and which is preferably dictated by the type of constructs within the code. Signatures representing code constructs that involve control transfer are hereinafter referred to generally as "jump signatures," and may include signatures representing break constructs or continue constructs.

In this regard, an extended signature is defined by two separate parts comprising a basic signature and jump signatures, when transfers of control are present within the program 12. For example, an extended signature may adhere to the following formula:

(A & (A's jump signatures)). (Signature A.7)

Extended signatures may be composed and merged, as discussed herein. For example, a second extended extended signature may adhere to the following formula:

(B & (B's jump signatures)). (Signature B.7)

To compose two extended signatures, their basic signatures are first composed. The result is the basic signature of the resulting extended signature. All the jump signatures in the first signatures are simply added to the jump signatures in the resulting signature. All the jump signatures in the second signature are added to the resulting extended signature, after composing the basic part of the first signature before them. Finally, if any two jump signatures in the resulting extended signature have the same type and label, they are replaced with a single jump signature with the same type and label and basic signature which is obtained by merging the basic parts of the two jump signatures. This process is applied until no two jump signatures have the same type and label. For example, signature A.7 and signature B.7 may be composed and the result is the following signature:

(A compose B) & (A's jump signatures) & (B's jump signatures with A composed in front of B)(Signature C.7)

Moreover, if any two jump signatures in the result have the same type and label, the signatures are replaced by a single entry with the same type and label, but whose basic signature is the merge of the original basic signatures. In order to merge to extended signatures, their basic signatures are first merged to yield the basic signature of the resulting extended signature. Then the jump signatures from both extended signatures are simply added to the jump signatures in the resulting extended signature. If any two jump signatures in the result have the same type and label, they are replaced by a single entry with the same type and label, but a basic signature which is the merge of the two basic signatures.

For example, merging extended signatures A.7 and B.7 gives (A merge B) & (A's jump signatures) & (B's jump signatures)

If any two jump signatures in the result have the same type and label, they are replaced by a single entry as described already.

The following is an example of merging jump signatures. Consider, for illustrative purposes, the following jump signatures:

(break label1 A)　　　　　　　　　　(Signature A.8)

(break label1 B)　　　　　　　　　　(Signature B.8)

(continue label 2 B)　　　　　　　　(Signature C.8)

Signature A.8 and signature B.8 then become the following:

(break label1 A compose B)　　　　(Signature D.8), and the merged signature of A.8, B.8, and C.8 then becomes (break label1 A compose B) & (continue label 2 B) (Signature E.8).

A basic signature is a special case of an extended signature with no jump signatures. The prior computation of type signatures for code blocks by successive composition and merging can be generalized to extended signatures.

Various types of nodes can comprise a coarse tree as discussed herein, including raw block nodes, sequence nodes, if-then-else nodes, continue nodes, break nodes, and loop nodes. The code verifier 20 employs composition and/or merger in order to determine the extended signature of these various types of nodes, and these procedures are discussed hereafter.

The extended signature for a raw block node is the basic signature computed for the raw block using the type inference procedures as discussed herein.

The extended signature for a sequence node is the signature computed for each block in the sequence composed into a single signature. For example, let "block0," "block1," "block2" . . . represent the children of the sequence node. Then the signature for the sequence node is the signature of each block composed together to form a single signature, and the formula for the sequence node may adhere to the following:

Signature(block0) compose Signature(block1) compose Signature(block2).

The code verifier 20 computes an extended signature for an if-then-else node, if(X,Y,Z), which is a conditional node with a conditional statement X, a then-part Y, and an else-part Z. The if-then-else can be written as follows:

If(X)
　　then Y;
　　else Z.

If no else block exists, then the code verifier 20 substitutes Y with an empty signature, which can written "( )→( )." If there is an else block, for example Z, the code verifier 20 then determines the signature for Z in its final conditional state. The code verifier 20 then determines the extended signature for the if-then-else block by merging the signatures computed for Y and Z and composing the signature of X with this merged signature. The result may adhere to the following formula:

SX compose merge (SY, SZ), where S is the computed signature of the conditional block X, SY is the computed signature of the then-part Y, and SZ is the computed signature of the else part Z.

The code verifier 20 determines an extended signature for a continue node, which is a node representing the immediate reexecution of the body of a loop and can be written "continue label1," where label1 is the loop label. The extended signature comprises a special basic signature, "nullsig," which nullifies the effect of the continue branch on the loop signature body. In addition, the continue node signature comprises a jump signature with the form:

(continue, label, ( )→( )), where label is the loop start block. Therefore, the extended signature representing the continue node is the following:

nullsig & (continue, label, ( )→( )).

As discussed herein, "nullsig" is a special basic signature, which eliminates the effect of the continue code branch on the basic signature for the loop body. It satisfies the following properties a. Composing any basic signature before nullsig results in nullsig b. Composing any basic signature after nullsig results in a type error c. Merging any basic signature with nullsig results in the signature itself The code verifier 20 determines an extended signature for a break node, which is the node representing the immediate exit from a loop that has a label, label2. Much like the continue node, the extended signature for a break node comprises the basic signature "nullsig." The break node signature comprises a jump signature with the form:

(break, label2, ( )→( )), where label2 represents the loop start node. Therefore, the extended signature is represented by the following:

nullsig, (break, label2, ( )→( )).

The procedure used to compute the extended signature for a loop node, described herein, requires the extended signatures corresponding to break and continue code paths, encompassed by the loop, to be separated from the extended type signatures corresponding to the rest of the body of the loop. The extended signatures, the compose and merge operations on them and the nullsig are designed to engineer this separation. Consider for example, a loop node which encompasses node B1 and a break node B2. B1 may have an extended signature which conforms to the formula B1's basic signature & jumps for B1 and is immediately followed by a break node B2 with extended signature nullsig & (break, label1, ( )->( ))

where label1 represents the loop start node

In computing the type signature for the loop node, the code verifier will compose the type signatures for nodes B1 and B2. Using the rules described above, the composed type signature is (B1's basic signature compose nullsig) & (jumps for B1)
& (break, label1, B1's basic signature compose ( ) ->( )), which is nullsig & (jumps for B1 & (break, label1, B1's basic signature)

Note that having nullsig as the basic signature for the break node nullified the basic signature for the extended signature corresponding to the code branch (comprising B1 and B2). Also note that the basic signature for the preceeding block B1 is transferred to the jump signatures for the code branch via the entry (break, label1, B1's basic signature). The same argument is applicable for continue nodes, as well.

The code verifier 20 also determines an extended signature for a loop node, which is a code construct containing a transfer of control. A loop structure may contain a transfer of control implemented with, for example, a continue construct. A continue construct is the transfer of control from somewhere within the loop to the beginning of the loop, as described herein. In addition, transfer of control within a loop may be implemented by a break construct, which is the transfer of control to code immediately following the loop, as described herein. Transfer of control may also be implemented by a return construct, which signals the end of the code procedure being verified. In this regard, a loop is delimited by zero or more continue branches, return branches or break branches.

For illustration, let L be a loop node, and let B be the coarse tree for the loop body. In such example, the code verifier 20 then determines the signature, SB, by computing the signature for the coarse tree node of the loop body. Let R represent the basic signature for the coarse tree node for the loop body, which is determined by eliminating the jump signatures of transfer of control constructs, such as continue constructs and break constructs. Further, let J represent the jumps in the loop body, let C represent the continue signature in J with loop node L, and let B represent the break signature in J with loop node L. Assume that the basic signature R determined by the code verifier 20 is the following:

R=bin|tin→tout|bouts. (Signature A.9)

The code verifier 20 then computes the basic signature R1 using the following formula:

R1=bin|tin→tin, (Signature B.9).

where R1 represents the portion of the loop body's basic signature, relevant to the type constraints associated with the loop itself.

As discussed herein, the loop body consists of code paths that are terminated by return, continue or break nodes. Moreover, in computing the extended signature SB for the body of the loop node, the effects of break and continue branches are already nullified in the basic signature and transferred to the jumps signature portion of the extended signature. Consequently, the basic signature in SB, namely R, is only influenced by the code paths within the loop node, which are delimited by return nodes. The basic signature R1 computed R, describes the properties of the return code paths in the loop, relevant to the signature computation process. The effects of the return path, described by touts and bouts, do not place any useful type constraints on code blocks preceding the loop node and code blocks following the loop node, since the effect of a return node is to exit the procedure. For this reason, the formula for R1 simply eliminates them. Moreover, tout is replaced by tin, to indicate that the loop body does not consume or produce types on the operand stack. However, the bin part of R imposes type constraints on the code executing prior to the loop body, and is hence retained in R1. Therefore, the extended signature for the loop node is the following:

basic signature & jumps, (Signature C.9)

where basic signature is obtained by composing the closure signature of the continue node, determined by the procedure discussed above, with the basic signature of the coarse tree node for the loop body, R1 and composing with the signature for the coarse tree node B. Therefore, basic signature can be represented by the formula:

basic Signature=closure(C) compose R1 compose B, and jumps comprises the jump signatures while eliminating the continue signature, C, and the break signature, B, already represented.

The closure portion of the loop's signature represents zero or more executions of the loop's continue code paths. In order to represent the zero or more iterations, the code verifier 20 determines a closure signature of the basic signature of the continue signature C. To illustrate determination of the closure signature of a loop, consider the following formula:

inBindC|inTypesC→outTypesC|outBindC. (Signature A.10)

To verify the zero or more iterations of the continue loop, certain conditions may be verified. First, inTypesC, which is a value that is consumed from the stack 28, is preferably identical in length as outTypesC, which is a value that is produced and pushed onto the stack 28. For example, if an "Integer," is consumed by the continue path, then a corresponding outTypesC is preferably an "Integer" or a type with identical length, which is acceptable to the "Integer" type. If, for example, a continue path which consumed one "Integer" value and then produced two "Integer" values that were pushed onto the stack 28, execution of the loop would ultimately result in a stack overflow.

Secondly, a type description in inTypesC necessarily accepts the corresponding type of outTypesC, which shares the same position. For example, as discussed herein, assume inTypesC has a type "Object." Because type "Object" accepts both types "Integer" and "String" then the condition is satisfied if outTypesC is either and "Integer" or a "String," or any other type description that is a subtype of "Object." However, if outTypesC comprised a "Double," then a valid loop closure does not exist and the type checking operation would fail.

In addition, if inBindC has an input binding to a variable, for example variable x, and outBindC has an output binding or partial output binding for variable x, namely x:S, then the type description of inBindC must accept the type description of outBindC. In this regard, T accepts S.

The closure signature representative of the continue path then takes the form:

$$cin|tin \rightarrow tin|cout \qquad \text{(Signature B.10)}$$

where cin contains all entries in inBindC. Moreover, the output binding and or partial output binding can be discarded and is excluded from cout.

If outBindC has an output binding or a partial output binding for a variable x, but inBindC does not have an input binding for variable x, cout includes a partial output binding for the variable.

By utilizing the techniques described hereinabove, the code verifier 20 translates the code 49 into a plurality of type signatures and composes and/or merges these signatures into a single signature representative of the coarse tree 59. This process of combining signatures according to the control structures linking them exposes type inconsistencies in the program, if any. Furthermore, as previously described, the code 49 may be a method within a program 12, and each method within a program 12 may be verified according to the techniques described herein. It should be noted that, when the code 49 represents a method within a program 12, the final signature of the method can be checked against the requirements of the control flow determined for the program.

For example, the final signature's input type descriptions, which represent the input type constraints for the entire method, can be checked to ensure that the input type constraints for the method are satisfied by the argument types of the method.

Note that conventional compilers utilizing well-known code verification techniques typically check for the same or similar conditions as those described in the above paragraph. Moreover, it should be apparent to one skilled in the art upon reading this disclosure that the final signatures of different methods can be utilized to check for these same or similar conditions.

The preferred use and operation of the code verifier 20 and associated methodology are described hereafter with reference to FIG. 18 and FIG. 19A-19F.

Through conventional techniques, a compiled set of code 49 is downloaded into memory 15. Before the code 49 is executed by the system 10, the code verifier 20 creates a coarse tree 59, as indicated in block 105, and described in more detail herein with reference to FIG. 5. Thereafter, as indicated in step 107, the code verifier 20 computes a signature for the coarse tree, which is described in more detail with reference to FIGS. 19A-19F. The code verifier 20 then performs type checking on the coarse tree signature computed. As indicated in step 108, the code verifier 20 checks the left sequence of the coarse tree signature. If the left sequence is not empty, then the code exhibits an error, and the code verifier 20 does not verify the code. If it is empty, then the code verifier 20 checks the input bindings of the coarse tree signature. If the input bindings are not consistent with the procedure requirements representative of the signature, then the code exhibits an error, as indicated in step 112, and the code verifier 20 does not verify the code. If the input bindings are consistent, then the code verifier 20 does not indicate an error in the code, and the verification process terminates.

Computation of a signature representative of the coarse tree will now be described in more detail with reference to FIG. 19A-19F. The code verifier 20 computes a signature for the coarse tree by determining the type of node for which a signature is being requested and computing the signature for that node type.

Figure 19A:
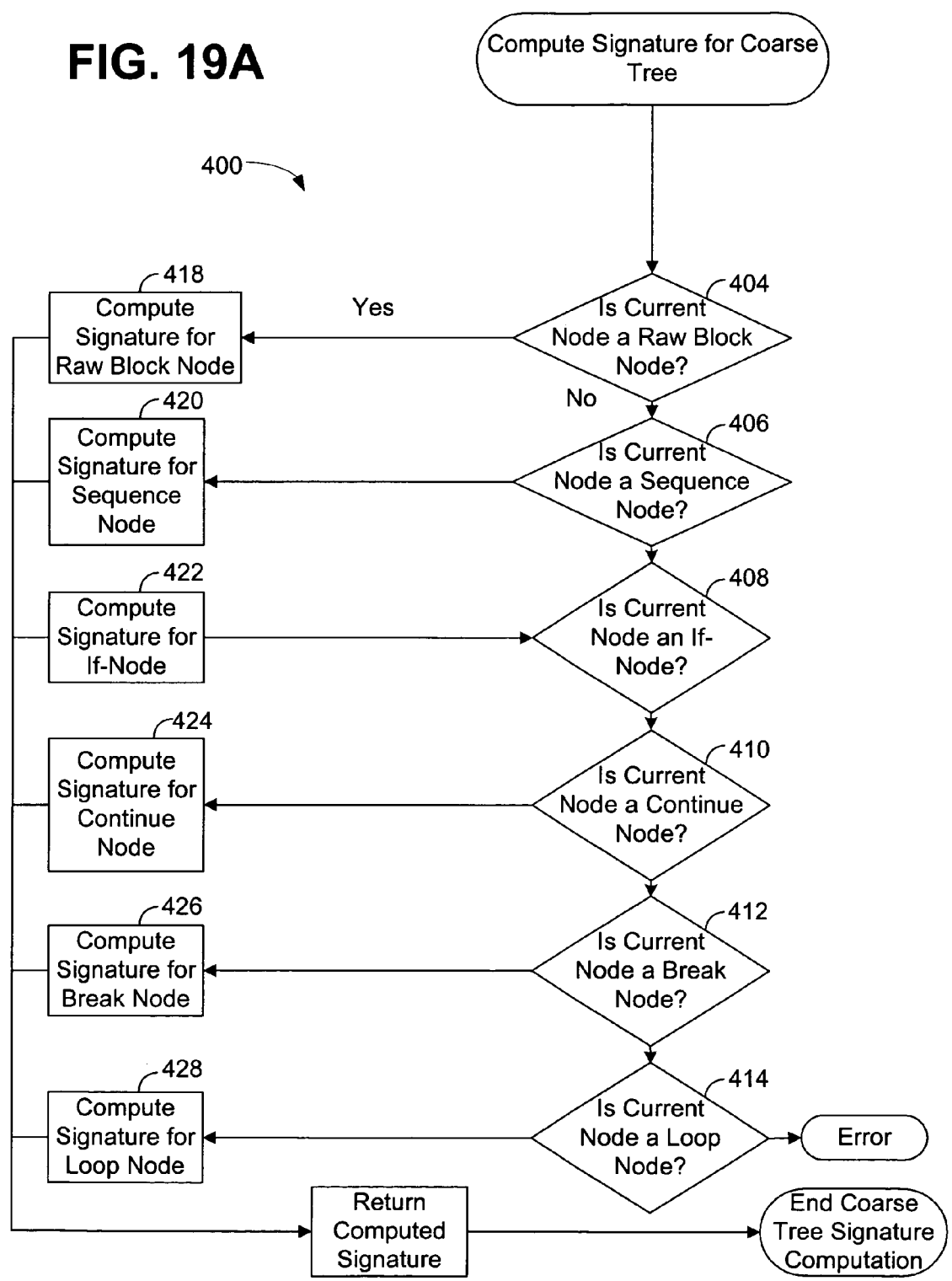
FIG. 19A is a flowchart illustrating an exemplary signature computation performed by the code verifier of FIG. 1.
Figure 19B:
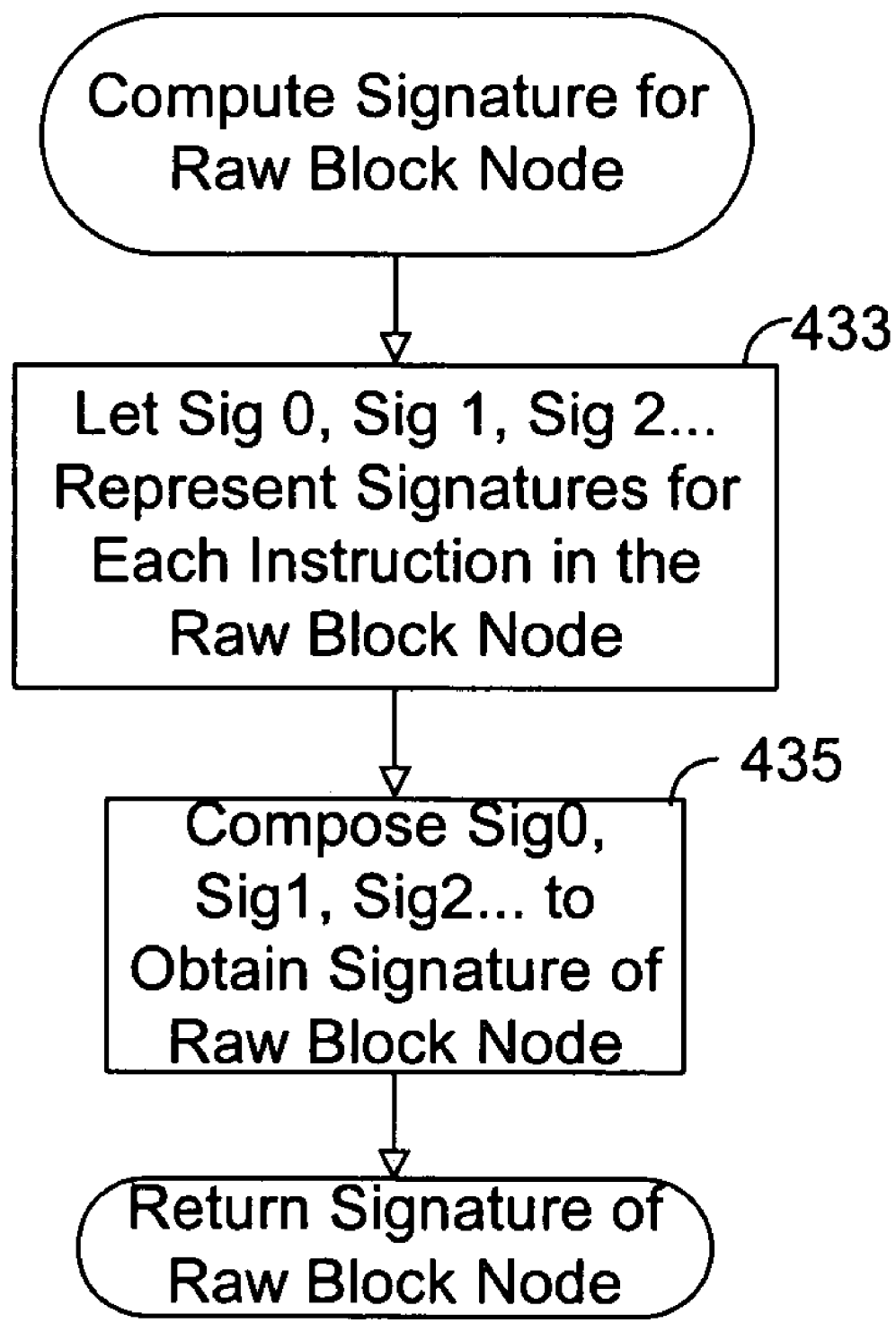
FIG. 19B is a flowchart illustrating an exemplary signature computation for raw block nodes performed by the code verifier of FIG. 1.

If the current node is a raw block node, as indicated in step 404, then the code verifier 10 computes a signature for the raw block node, as indicated in step 418, and which is described in more detail in FIG. 19B. Note that a raw node represents a set of instructions for which there is no local transfer of control. Therefore, the type signatures representing the instructions within the raw node can be translated into a single composed signature, which forms the signature for the node. With reference to FIG. 19B, the code verifier 20 lets Sig0, Sig1, Sig2 . . . represent the signatures for each instruction in the raw block node. The code verifier 20 then composes Sig0, Sig1, Sig2 . . . to obtain the signature representative of the raw block node.

Figure 19C:
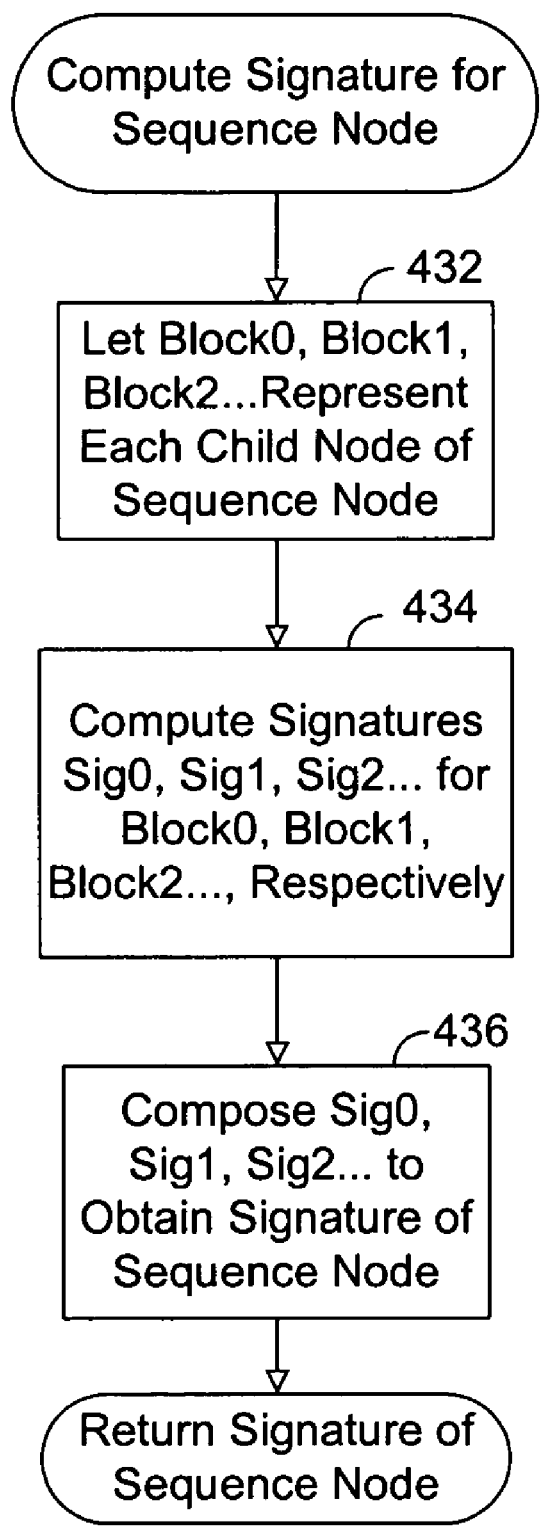
FIG. 19C is a flowchart illustrating an exemplary signature computation for sequence nodes performed by the code verifier of FIG. 1.
Figure 19D:
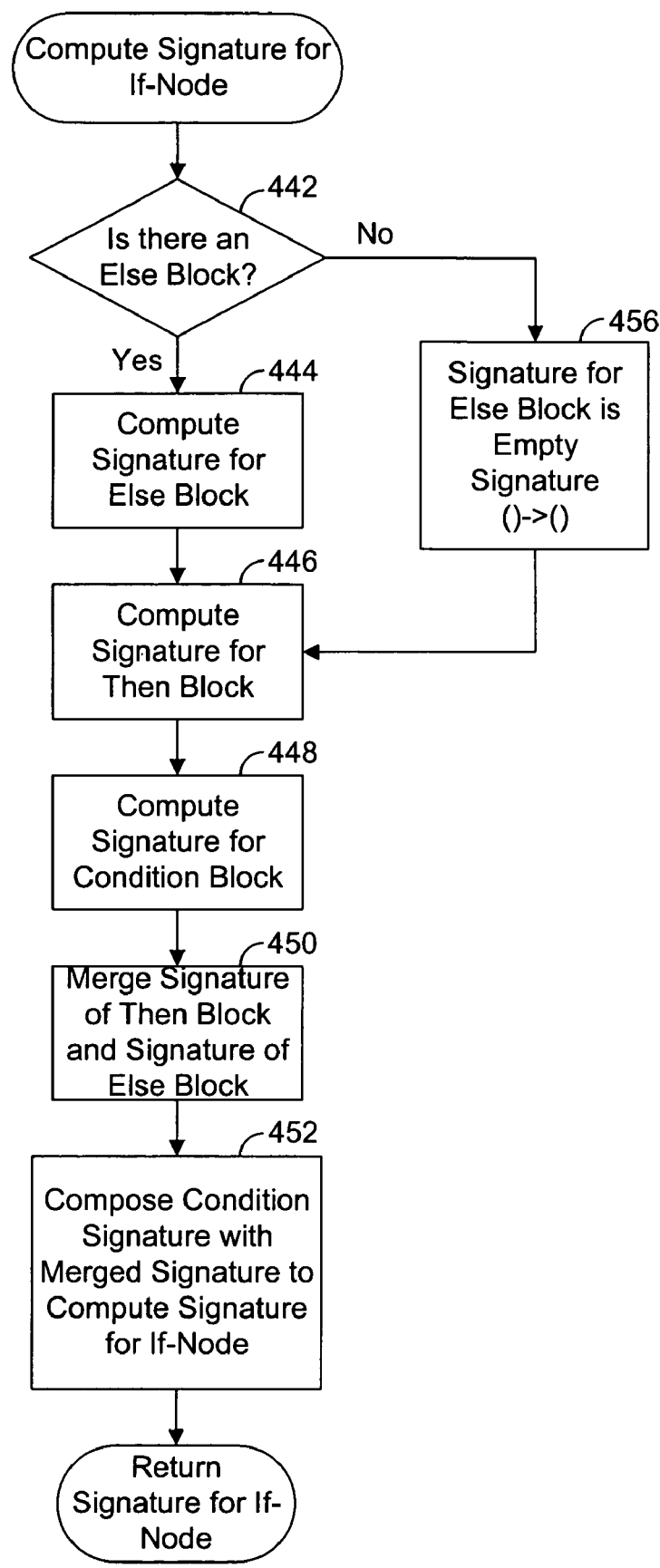
FIG. 19D is a flowchart illustrating an exemplary signature computation for if-nodes performed by the code verifier of FIG. 1.
Figure 19E:
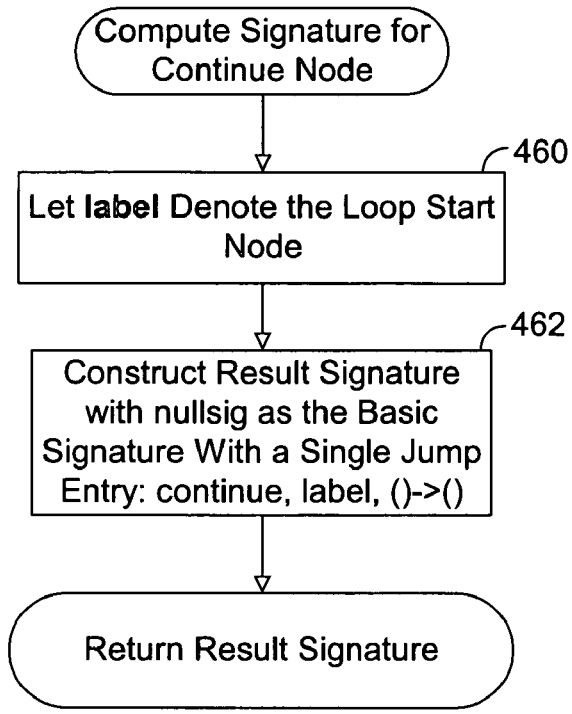
FIG. 19E is a flowchart illustrating an exemplary signature computation for continue nodes performed by the code verifier of FIG. 1.
Figure 19F:
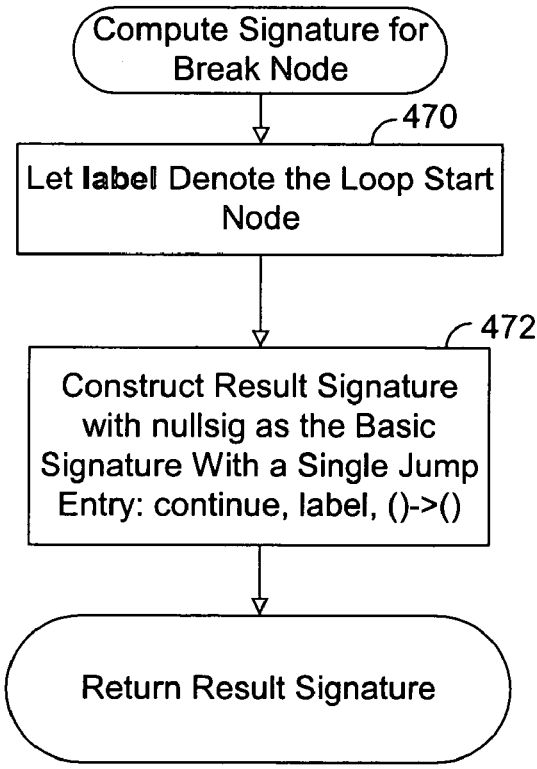
FIG. 19F is a flowchart illustrating an exemplary signature computation for break nodes performed by the code verifier of FIG. 1.

If the Node is a sequence node, as indicated in step 406 of FIG. 19A, then the code verifier computes a signature for the sequence node, as indicated in step 420, and which is described in more detail in FIG. 19C. Note that a sequence node represents the execution of instructions in sequential order. For example, if a program contained three sequential instructions, A, B, and C, then a sequence node representing the sequential instructions would comprise a sequence node having three children nodes, A, B, and C.

FIG. 19C describes in more detail an exemplary architecture and functionality of the code verifier 20 for computing a signature for a sequence node. For illustrative purposes, as indicated in step 432, the code verifier 20 lets Block0, Block1, and Block2 represent each child node of the sequence node. The code verifier 20 then computes a signature for each of the child nodes, Block0, Block1, and Block2, as indicated in step 434. The code verifier 20 then composes the signatures of each child node, which provides the signature for the sequence node, as indicated in step 436.

If the current node is an if-node, as indicated in step 408 of FIG. 19A, then the code verifier computes a signature for the if-node, as indicated in step 422. Note that an if-node is a conditional node with a conditional block, a then block and an else block. Syntactically, an if-then-else expression can be written "if x, then y, else z." Computation of a signature for an if-node will now be discussed in more detail with reference to FIG. 19D.

As indicated in step 442, if there is not an else block associated with the if-node, then the signature for the else block portion of the if-node signature is the empty signature, which is represented with "( )->( )." If there is an else block, then the code verifier 20 computes a signature for the then block, as indicated in step 446. Thereafter, the code verifier 20 computes a signature for the condition block, as indicated in step 448.

The code verifier 20 then merges the computed then block signature and else block signature, as indicated in step 450. As discussed herein, the then and else branches of the if-node represent alternative code branches. Therefore, the merger operation, described in more detail herein, is applied to the then and else signature blocks to compute a single signature representative of the alternative branches of code. The code verifier 20 then composes the condition signature computed in step 448 with the merged signature computed in step 450 to obtain a signature representative of the if-node, as indicated in step 452.

If the current node is a continue node, as indicated in step 410 of FIG. 19A, then the code verifier 20 computes a signature for the continue node, as indicated in step 424. Note that a continue node is a node representing the immediate re-execution of the body of the loop to which it is associated. For example, "continue label1" indicates code that re-executes the instructions beginning at the code address, label1. Computation of a signature representative of such a node will now be described in more detail with reference to FIG. 19E.

As indicated in step 460, the code verifier 20 first lets label denote the loop start node. The code verifier 20 then constructs the result signature with nullsig as the basic signature with a single jump entry, "continue, label, ( )->( )," as indicated in step 462. The resulting signature, which takes the form:

nullsig & continue, label, ( )->( ), is returned.

If the current node is a break node, as indicated in step 412 of FIG. 19A, then the code verifier 20 computes a signature for the break node, as indicated in step 426. Note that a break node is a node representing the transfer of control from within a loop to the code following the loop. Computation of a signature representative of such a node will now be described in more detail with reference to FIG. 19F.

As indicated in step 470, the code verifier 20 first let label denote the loop start node. The code verifier 20 then constructs the result signature with nullsig as the basic signature with a single jump entry, "break, label, ( )->( )," as indicated in step 472. The resulting signature, which takes the form:

nullsig & break, label, ( )->( ), is returned.

If the current node is a loop node, as indicate din step 414 of FIG. 19A, then the code verifier 20 computes a signature for the loop node. Computation of a signature representative of such a node will now be described in more detail with reference to FIG. 19G.

First, the code verifier 20 computes a signature for the coarse tree node of the loop body, as indicated in step 480. Then, the code verifier 20 extracts the basic signature of the signature of the coarse tree node of the loop body, as indicated in step 482. The code verifier 20 then computes the jump signatures present within the signature of the coarse tree node of the loop body.

If the loop contains a continue node, as indicated in step 486, then the code verifier 20 computes a continue signature in the jump signature, as indicated in step 508. If no continue node is present, then the code verifier 20 associates an empty signature with the continue signature, as indicated in step 504.

If the loop contains a break node, as indicated in step 488, then the code verifier 20 computes a break signature in the jump signature, as indicated in step 510. If no break node is present, then the code verifier 20 associates an empty signature with the continue signature, as indicated in step 506.

In step 490, the code verifier 20 discards the output bindings present in the basic signature of the loop body, and replaces the right sequence by the left sequence. The code verifier 20 then computes the closure signature of the continue signature, discussed in more detail herein.

The code verifier 20 then computes a basic/break signature by composing the basic signature and the break signature, as indicated in step 474. As indicated in step 496, the code verifier 20 then computes the return basic signature by composing the basic/break signature computed in step 494 with the closure signature computed in step 492. The code verifier 20 computes the return jump signature by subtracting from the jump signature computed in step 484 the continue signature computed in step 508 and the break signature computed in step 510.

The code verifier 20 then computes the signature for the loop node as the following:

(return basic signature) & (return jump signature), as indicated in step 500.

If no definition for the current node exists with the algorithm of FIG. 19A, then the signature computation exits in error, as indicated in step 417.

It should be noted that the present disclosure has been described in numerous examples as processing instructions written in Java. However, the present disclosure should not be so limited, and it should be apparent that instructions from other types of languages can be similarly translated into type signatures, which are then type checked according to the techniques described herein.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Now, therefore, the following is claimed:

1. A code verification system, comprising:
   memory for storing a compiled program; and
   logic configured to translate the compiled program into a set of human-readable instructions and construct a coarse tree representing a program flow of the set of human-readable instructions, the logic configured to compute, based on the coarse tree, type signatures representative of code constructs of the compiled program, each of the type signatures specifying a respective type constraint for the code constructs, the type signatures including a first type signature representative of at least one instruction in a first path in the program flow and a second type signature representative of at least one instruction in a second path that is alternative to the first path in the program flow, the logic further configured to compute a merged signature by merging the first and second type signatures, wherein the merged signature has a partial output binding indicating that the at least one instruction in the first path leaves a variable undisturbed and the at least one instruction in the second path writes, to the variable, a data type specified by the partial output binding, and to compose the merged signature with a third type signature to form a composed signature, the logic further configured to perform type checking for the compiled program based on the composed signature and to indicate whether the compiled program passed the type checking.

2. The code verification system of claim 1, wherein the compiled program is comprised of bytecode representative of instructions and instruction operands of the compiled program.

3. The code verification system of claim 1, wherein the logic is further configured to compute a continue type signature representative of a continue code construct.

4. The code verification system of claim 1, wherein the logic is further configured to compute a break type signature representative of a break code construct.

5. The code verification system of claim 1, wherein the logic is further configured to compute a loop type signature representative of a loop code construct.

6. The code verification system of claim 1, wherein the logic is further configured to detect a type error by analyzing the second type signature of the coarse tree.

7. The code verification system of claim 1, wherein the logic is configured to display a message to a user in response to a detection of an error during the type checking.

8. A code verification system comprising:
   memory for storing a compiled program; and
   a code verifier configured to create a coarse tree representative of the compiled program, the code verifier further configured to compute a coarse tree type signature representative of a plurality of code constructs and to base computation of the coarse tree type signature upon a plurality of code construct type signatures incorporating output bindings and partial output bindings representative of the plurality of code constructs, each of the partial output bindings respectively indicating that instructions in a path of a program flow for the compiled program leave a variable undisturbed and at least one instruction in an alternative path of the program flow writes, to the variable, a data type specified by the respective partial output binding, the code verifier further configured to perform type checking for the compiled program based on the plurality of code construct type signatures and to indicate whether the compiled program passed the type checking.

9. The code verification system of claim 8, wherein the code verifier is further configured to identify a node type within the coarse tree representative of one of the plurality of code constructs.

10. The code verification system of claim 9, wherein the node type comprises a raw block node, a sequence node, an if-node, a continue node, a break node, or a loop node, and the code verifier is configured to compute the plurality of code construct type signatures representative of each node type.

11. The code verification system of claim 10, wherein the code verifier is further configured to compose code construct type signatures for instructions comprising the raw block node to obtain a signature representative of the raw block node.

12. The code verification system of claim 10, wherein the sequence node comprises two child nodes and the code verifier is configured to compute the code construct type signatures for the two child nodes of the sequence node, the code verifier further configured to compose the code construct type signatures for the two child nodes to compute a sequence node type signature representative of the sequence node.

13. The code verification system of claim 10, wherein the if-node is represented by a condition block, a then block, and an else block.

14. The code verification system of claim 13, wherein the code verifier is further configured to compute an else type signature for the else block of the if-node, compute a then type signature for the then block of the if-node, and compute a type signature for the condition block of the if-node, the code verifier further configured to merge the then type signature with the else type signature to obtain a merged signature, the code verifier further configured to compose the type signature for the condition block with the merged signature to obtain the code construct type signature representative of the if-node.

15. The code verification system of claim 10, wherein the code verifier is further configured to compute a continue type signature representative of the continue node, the continue type signature representing the continue node with a nullsig as a basic signature and a single jump entry.

16. The code verification system of claim 10, wherein the code verifier is further configured to compute a break type signature representative of the break node, the break type signature representing the break node with a nullsig as a basic signature and a single jump entry.

17. The code verification system of claim 8, wherein the code verifier is configured to display a message to a user in response to a detection of an error during the type checking.

18. A code verification method, comprising the steps of:
    storing a compiled program;
    translating the compiled program into a set of human-readable instructions;
    constructing a coarse tree representing a program flow of the set of human-readable instructions;
    computing type signatures representative of code constructs of the compiled program, each of the type signatures specifying a respective type constraint for the code constructs, the type signatures including a first type signature representative of at least one instruction in a first path in the program flow and a second type signature representative of at least one instruction in a second path that is alternative to the first path in the program flow;
    merging the first and second type signatures thereby forming a merged signature, wherein the merged signature has a partial output binding indicating that the at least one instruction in the first path leaves a variable undisturbed and the at least one instruction in the second path writes, to the variable, a data type specified by the partial output binding;
    composing the merged signature with a third type signature thereby forming a composed signature;
    performing type checking based on the composed signature; and
    indicating whether any errors are detected in the type checking.

19. The code verification method of claim 18, wherein the compiled program is comprised of bytecode representative of instructions and instruction operands of the compiled program.

20. The code verification method of claim 18, further comprising the step of computing a continue type signature representative of a continue code construct.

21. The code verification method of claim 18, further comprising the step of computing a break type signature representative of a break code construct.

22. The code verification method of claim 18, further comprising the step of computing a loop type signature representative of a loop code construct.

23. The code verification method of claim 18, further comprising the step of detecting a type error by analyzing the second type signature of the coarse tree.

24. The code verification method of claim 18, wherein the indicating step comprises the step of displaying a message to a user in response to a detection of an error during the type checking.

* * * * *

UNITED STATES PATENT AND TRADEMARK OFFICE
CERTIFICATE OF CORRECTION

PATENT NO.        : 7,287,243 B2
APPLICATION NO. : 10/752989
DATED             : October 23, 2007
INVENTOR(S)       : Christopher Dollin et al.

It is certified that error appears in the above-identified patent and that said Letters Patent is hereby corrected as shown below:

In column 27, line 3, delete "O001:type4" and insert -- 0001:type4 --, therefor.

In column 28, line 48, delete "examples" and insert -- example1 --, therefor.

In column 30, line 63, delete "inBind3→inTypes3" and insert -- inBind3|inTypes3 --, therefor.

Signed and Sealed this

Fifth Day of August, 2008

JON W. DUDAS
*Director of the United States Patent and Trademark Office*